(12) United States Patent
Murakami

(10) Patent No.: US 7,003,222 B1
(45) Date of Patent: Feb. 21, 2006

(54) CAMERA, LENS APPARATUS, AND CAMERA SYSTEM

(75) Inventor: Junichi Murakami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 10/649,965

(22) Filed: Aug. 26, 2003

(30) Foreign Application Priority Data

Aug. 26, 2002 (JP) ..................................... 2002-246010

(51) Int. Cl.
*G03B 13/36* (2006.01)

(52) U.S. Cl. ......................................... 396/79; 396/135
(58) Field of Classification Search ............. 396/79–83, 396/133, 135, 136; 348/347, 357; 359/823, 359/824

See application file for complete search history.

(56) References Cited

U.S. PATENT DOCUMENTS 5,206,677 A * 4/1993 Onuki et al. ................. 396/82

5,933,661 A * 8/1999 Kawanami .................... 396/55

FOREIGN PATENT DOCUMENTS

| JP | 5-333257 | 12/1993 |
|----|----------|---------|
| JP | 7-77648  | 3/1995  |

* cited by examiner

*Primary Examiner*—W. B. Perkey
(74) *Attorney, Agent, or Firm*—Morgan & Finnegan LLP

(57) ABSTRACT

A camera which maintains accuracy of stop position in accordance with the state of an image-taking optical system and allows driving of a focus lens to a target position in a short time period, is disclosed. The camera comprises a motor which drives the focusing lens, and a controller which controls the motor such that the focusing lens is stopped at the target position by performing deceleration control in accordance with a predetermined deceleration control pattern. The controller changes the deceleration control pattern in accordance with the state of the image-taking optical system detected by the state detector.

23 Claims, 16 Drawing Sheets

CAMERA, LENS APPARATUS, AND CAMERA SYSTEM

BACKGROUND OF THE INVENTION

1. Field of the Invention

The present invention relates to a camera, a lens apparatus, and a camera system for driving control of a lens.

2. Description of the Related Art

Conventionally, cameras or image-taking lenses which have an autofocus function have been frequently used.

The autofocus function is realized by detecting the focusing state of an image-taking lens to find a defocus amount, calculating a movement amount of a focus lens corresponding to the defocus amount, and driving the focus lens by the movement amount derived from the calculation. Driving control of the focus lens by a motor is absolutely necessary for the autofocus function.

A typical method of the lens driving control involves accelerating a motor or a lens to a target speed (acceleration control), driving the motor or lens at a constant sped equal to the target speed (constant-speed control), then decelerating the motor or lens for stopping it precisely at a target position (deceleration control), and finally stopping the motor or lens. All the accelerating control, constant-speed control, and decelerating control are speed control in which the rotational speed of the motor or the moving speed of the lens is detected at a sampling rate, the detected speed is compared with a target speed, and the motor is decelerated if the detected speed is higher than the target speed or the motor is accelerated if the detected speed is lower than the target speed, thereby maintaining the target speed or reaching the target speed.

When a DC motor, for example, is used as the motor, acceleration or deceleration is performed by increasing or reducing the driving effective voltage or the driving effective current. Alternatively, when a vibration type motor is used in which periodic wave voltages (alternating voltages or pulse voltages, etc.) with two different phases are applied to piezoelectric elements to excite vibration of a vibrator such that a contact body is relatively moved, acceleration or deceleration is performed by changing the frequencies, voltage values, or a phase difference of the aforementioned periodic wave voltages.

The lens driving control is preferably achieved as fast as possible for smooth autofocus operation. The control of a focus lens, however, requires high accuracy of stop position of the lens at a target position to maintain focusing accuracy. To hold the high accuracy of stop position, the focus lens needs to be decelerated sufficiently to a low speed and then stopped.

To address the need, various approaches have been adopted. For example, Japanese Patent Application Laid-Open No. H5(1993)-333257 has proposed a method of maintaining stable accuracy of stop position and driving time without being affected by load variations associated with the direction of a lens apparatus or ambient temperature.

The method of lens driving control employs a means for detecting the direction of the lens apparatus and ambient temperature. When the detection result shows that a heavy load is applied, the load of a lens itself can serve as a brake to perform sharp deceleration, so that a larger deceleration area (an amount of lens driving from a deceleration start position to a target position) is set. On the other hand, when the detection result shows that a light load is applied, a smaller deceleration area is set since the load of the lens itself does not serve as a brake to make the deceleration difficult.

Since the focal depth varies depending on setting of a stop (diaphragm, etc.), the required accuracy of stop position of a focus lens can be relaxed when the aperture of the stop is narrowed. With attention focused on this fact, Japanese Patent Application Laid-Open No. H7(1995)-77648 has proposed a method of controlling the stop position of a focus lens in combination with detection of the state of a stop.

In a lens with a variable focal length such as a zoom lens, the focal depth is larger on the wide-angle side, while the focal depth is smaller on the telephoto side. Thus, a focus lens is moved by a larger amount on the wide-angle side and by a smaller amount on the telephoto side to correct the same defocus amount.

High accuracy is necessary for the focus lens stop position on the telephoto side, but relatively low accuracy is allowed on the wide-angle side as compared with the telephoto side.

Conventionally, however, final accuracy of stop position of the focus lens is determined on the basis of the high stop accuracy required on the telephoto side. As a result, the accuracy of stop position of the focus lens is unnecessarily high on the wide-angle side to need a longer time period to correct the defocus amount.

The method of lens driving control proposed in Japanese Patent Application Laid-Open No. H5(1993)-333257 aims to minimize the driving time in consideration of load variations associated with the direction of a lens apparatus and ambient temperature. The method, however, does not lead to solution of the aforementioned problem. In addition, the method of lens driving control proposed in Japanese Patent Application Laid-Open No. H7(1995)-77648 aims at power savings, and does not result in solution of the aforementioned problem.

SUMMARY OF THE INVENTION

It is an object of the present invention to provide a camera, a lens apparatus, and a camera system which maintain necessary accuracy of stop position of a focus lens in accordance with the state of an image-taking optical system and allow driving of the focus lens to a target position in a short time period.

To achieve the abovementioned object, according to one aspect of the present invention, a camera, a lens apparatus, or a camera system comprises an image-taking optical system which includes a focusing lens, a motor which drives the focusing lens, a controller which controls the motor such that the focusing lens is stopped at a target position by performing deceleration control in accordance with a predetermined deceleration control pattern. And it comprises a state detector which detects a state of the image-taking optical system. The controller changes the deceleration control pattern in accordance with the state detected by the state detector.

According to another aspect of the present invention, a camera, a lens apparatus, or a camera system comprises an image-taking optical system which includes a focusing lens, a motor which drives the focusing lens, a position detector which detects a position of the focusing lens, a controller which controls the motor such that the focusing lens is stopped at a target position by performing deceleration control from the time when a difference between the target position and the position detected by the position detector is equal to or smaller than a predetermined amount. And it comprises a state detector which detects a state of the image-taking optical system. The controller changes the predetermined value in accordance with the state detected by the state detector.

These and other characteristics of the camera, lens apparatus, and camera system according to the present invention will be apparent from the following description of specific embodiments with reference to the drawings.

BRIEF DESCRIPTION OF THE DRAWINGS

FIG. 9 is a flow chart for explaining processing of a camera which is Embodiment 3 of the present invention;

DETAILED DESCRIPTION OF THE PREFERRED EMBODIMENTS

Preferred embodiments of the present invention are hereinafter described with reference to the drawings.

(Embodiment 1)

Figure 1:
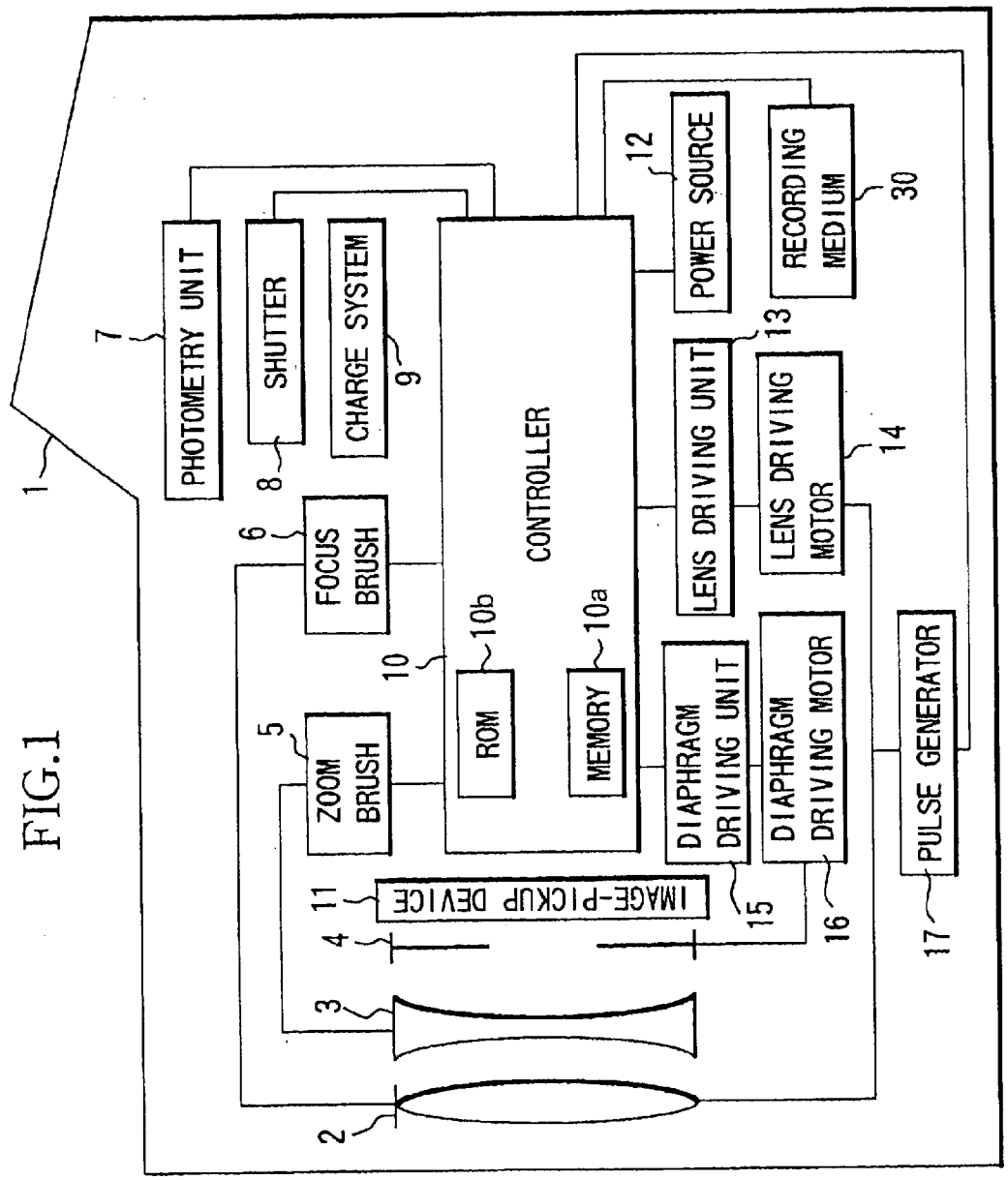
FIG. 1 is a block diagram showing a camera which is Embodiment 1 of the present invention.

FIG. 1 shows the structure of a digital camera with a built-in lens which is Embodiment 1 of the present invention. In FIG. 1, reference numeral 1 shows the digital camera. The camera 1 has an image-taking optical system including a focusing lens 2, a zooming lens 3, and a diaphragm (stop) 4. In this embodiment, though a diaphragm is used as a stop, other types of stop (for example, a guillotine type or a scissors type) may be used.

Reference numeral 5 shows a zoom brush serving as a state detector which slides over a resistor, not shown, in association with movement of the zooming lens 3 to detect the position of the zooming lens 3. A signal with a voltage value corresponding to the position of the zooming lens 3 is output from the zoom brush 5. Reference numeral 6 shows a focus brush serving as a position detector which slides over a resistor, not shown, in association with movement of the focusing lens 2 to detect the position of the focusing lens 2. A signal with a voltage value corresponding to the position (zone) of the focusing lens 2 is output from the focus brush 6.

Reference numeral 7 shows a photometry unit which measures an amount of light passing through the image-taking optical system. Reference numeral 8 shows a shutter which controls the exposure time of an image-pickup device 11. Reference numeral 9 shows a charge system which performs charge driving of the shutter 8. Reference numeral 10 shows a controller which is responsible for various types of control in the camera 1 and formed of a CPU, an MPU or the like. The image-pickup device 11 is formed of a photoelectric conversion element such as a CCD and a CMOS sensor which photoelectrically converts an object image formed by the image-taking optical system. Signals output from the image-pickup device 11 are converted into image signals after undergoing various types of processing by an image processing circuit, not shown, included in the controller 10. The image signals are displayed on an electric viewfinder, not shown, or recorded on a recording medium 30 such as a semiconductor memory, a magnetic disk, or an optical disk.

The controller 10 detects the focusing state of the image-taking optical system with Phase Difference Detection Method or the like based on signals from a plurality of image-pickup areas on the image-pickup device 11 (this operation is hereinafter referred to as "focus detection") and makes calculations of an amount or a direction of driving of the focusing lens 2 to focus the image-taking optical system on an object.

Reference numeral 12 shows an electric power source. Reference numeral 13 shows a lens driving unit for driving a focus driving motor 14 in response to a command signal from the controller 10. Reference numeral 15 shows a diaphragm driving unit for driving a diaphragm driving motor 16 in response to a command signal from the controller 10.

In addition, the camera 1 of Embodiment 1 has a pulse generator 17 serving as a position detector which generates a pulse signal in association with movement of the focusing lens 2. The pulse generator 17 is formed, for example, of a disk-shaped pulse plate which has a plurality of slits formed therein and rotates with movement of the focusing lens 2, and a photo-interrupter which outputs a pulse signal generated by the slits and non-slit areas of the pulse plate passing and blocking light as the pulse plate rotates. However, a photo-reflector or a magnetic sensor may be used as the pulse generator 17, not limited to the photo-interrupter.

Next, description is made for autofocus operation of the camera of Embodiment 1 (mainly realized by the controller 10) with reference to flow charts of FIGS. 2 to 5. In FIGS. 2 to 5, the same circled numbers show links in the flows.

Figure 2:
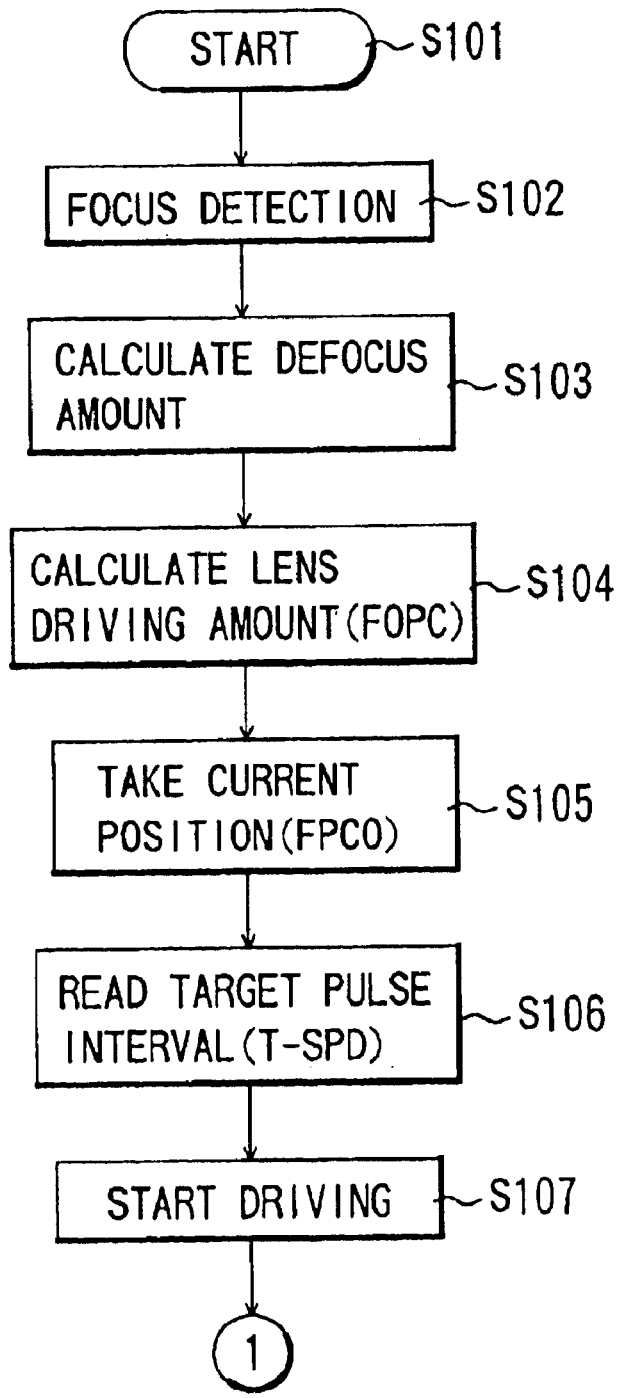
FIG. 2 is a flow chart for explaining processing of the camera of Embodiment 1.

FIG. 2 shows a flow chart of steps from an on-operation of an image-taking preparation switch, not shown, in the camera to start of driving of the focusing lens 2.

(Step (Abbreviated as "S" in the Figures) 101)

When the image-taking preparation switch is operated, the controller 10 starts this processing.

(Step 102)

The controller 10 performs the focus detection of the image-taking optical system based on signals from a plurality of image-pickup areas on the image-pickup device 11.

(Step 103)

The controller 10 calculates a defocus amount from the focus detection result obtained at step 102.

(Step 104)

The controller 10 calculates a target driving amount by which the focusing lens 2 should be driven to an in-focus position (a target position) based on the defocus amount calculated at step 103. The target driving amount is calculated as the amount of a pulse signal generated by the pulse generator 17. The driving amount is saved as FOPC in a memory 10*a* formed of an EEPROM, for example, provided in the controller 10.

(Step 105)

The controller 10 reads the current pulse count value and saves the value as FPCO in the memory 10*a*. The pulse signal output from the pulse generator 17 is counted by the controller 10 such that the controller 10 can read it as a pulse count value. In addition, a pulse interval measuring timer is provided for measuring an elapsed time period from the preceding pulse signal input at the time of pulse signal input to measure the pulse interval.

(Step 106)

The controller 10 reads data indicating a target driving speed of the focusing lens 2 saved in a ROM 10*b* in the controller 10. The target speed is saved as a target pulse interval (T-SPD) of a pulse signal generated by the pulse generator 17. Predetermined values are saved as the target speed in accordance with brightness of an object and the focal length of the image-taking optical system.

(Step 107)

The controller 10 outputs a control signal to the lens driving unit 13 to drive the lens driving motor 14. Thus, the driving of the focusing lens 2 is started.

After the start of the control of the focusing lens 2, acceleration control is first performed to reach the target speed. When the remaining driving amount (the difference between the number of pulses corresponding to the target position and the current pulse count value) is equal to or smaller than a predetermined amount (hereinafter referred to as a deceleration pulse amount), the target speed is decelerated. When the target position is reached, the lens driving motor 14 is stopped.

Figure 3:
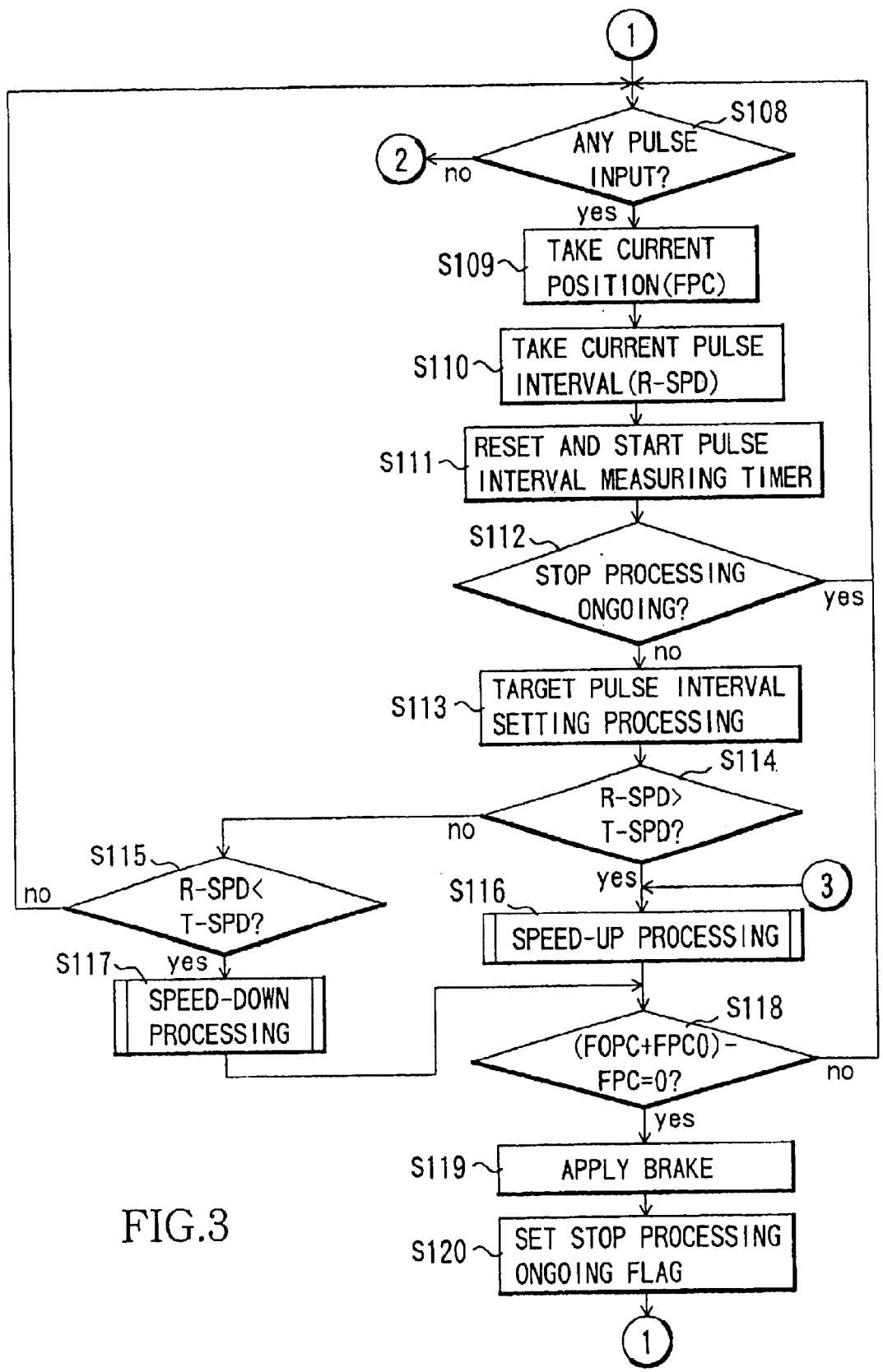
FIG. 3 is a flow chart for explaining the processing of the camera of Embodiment 1.
Figure 4:
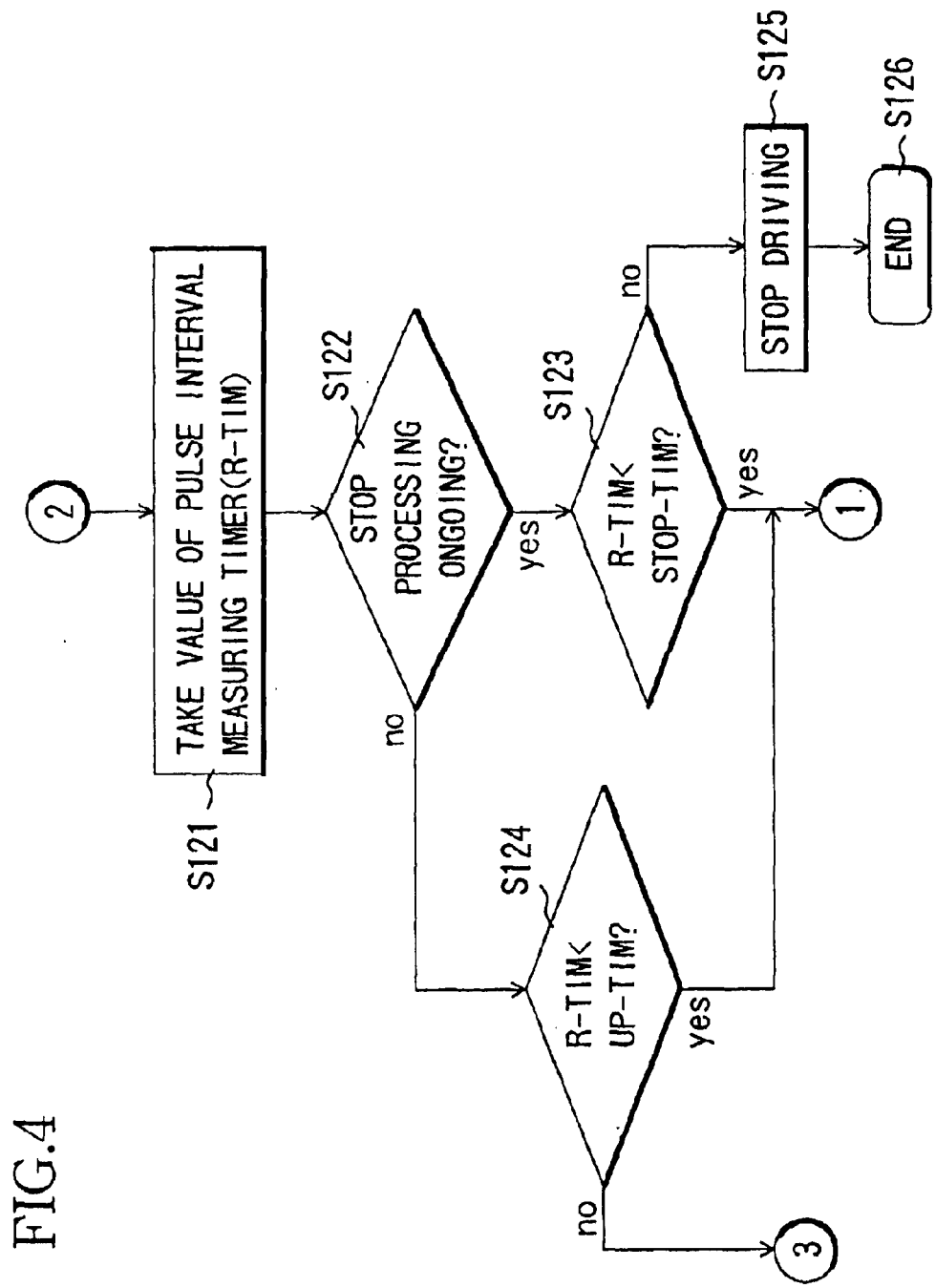
Figure 5:
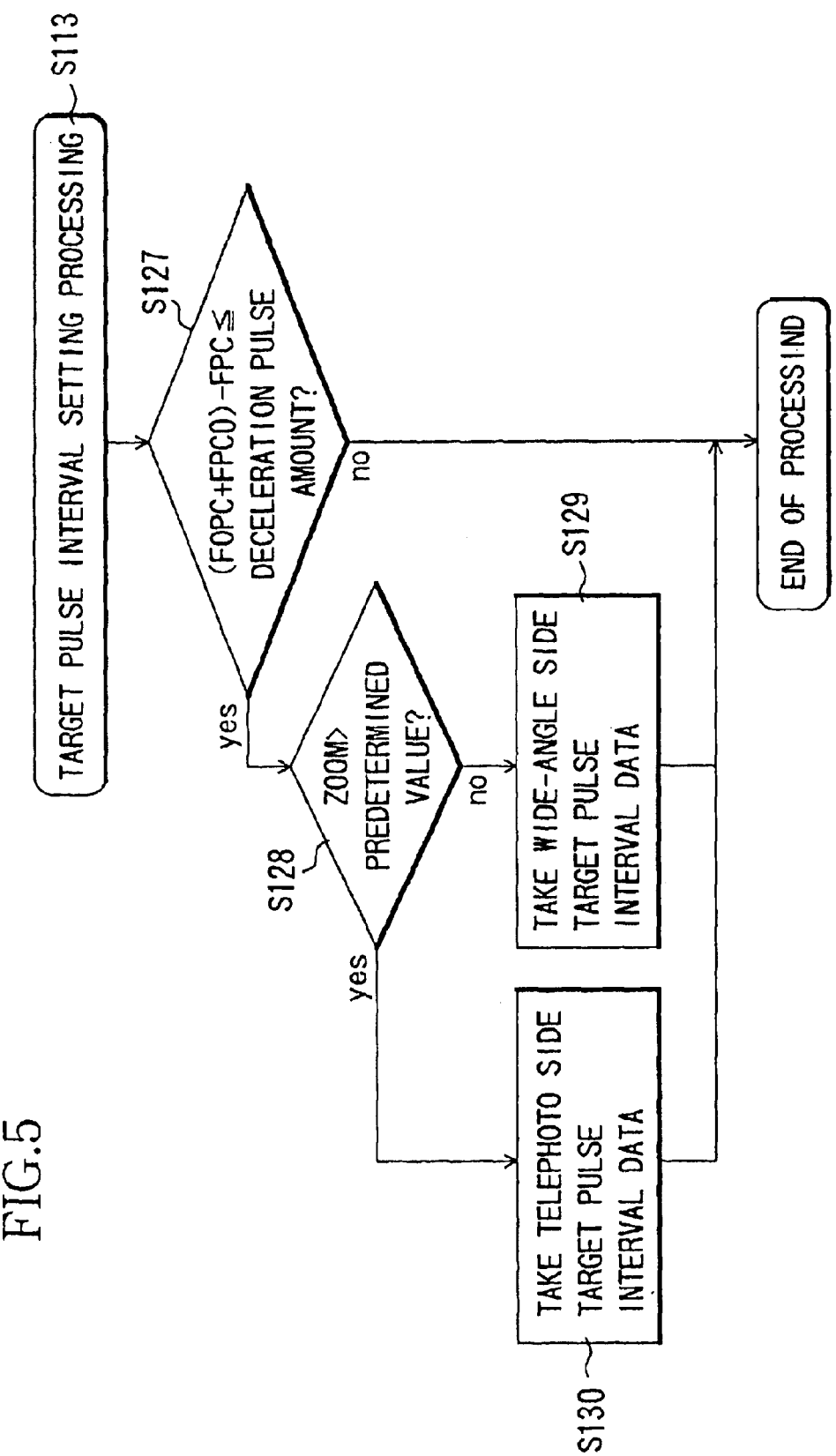
FIG. 5 is a flow chart for explaining the processing of the camera of Embodiment 1.

Next, description is made for control from the start of the driving of the focusing lens to the end of the driving with reference flow charts of FIGS. 3 to 5.

(Step 108)

The controller 10 determines whether or not a pulse signal is input thereto from the pulse generator 17. When a pulse signal is input, the flow proceeds to step 109. When no pulse signal is input, the flow proceeds to step 121.

(Step 109)

Since it is determined that a pulse signal is input at step 108, the pulse count value indicating the current position of the focusing lens 2 has been changed. Thus, the controller 10 takes a pulse count value FPC indicating the current position of the focusing lens 2.

(Step 110)

Since it is determined that the pulse signal is input at step 108, the controller 10 reads the current measured value of the real pulse interval (R-SPD).

(Step 111)

The controller 10 resets and restarts the pulse interval measuring timer so that, when a pulse signal is input next, the measured value of the pulse interval can be obtained.

(Step 112)

The controller 10 checks a stop processing ongoing flag. When the flag is set, it is determined that stop processing is being performed and the flow returns to step 108. When the flag is reset, the flow proceeds to step 113.

(Step 113)

The controller 10 performs setting of a target driving speed. Specifically, the controller 10 determines whether or not the remaining driving amount to the target position represented by (FOPC+FPCO)−FPC is equal to or smaller than the deceleration pulse amount, at the start of which deceleration is to be started. When the remaining driving amount is equal to or smaller than the deceleration pulse amount, the controller 10 newly takes T-SPD to change the target driving speed (the target pulse interval). Specifically, when the remaining driving amount is equal to or smaller than the deceleration pulse amount, the target speed is updated to achieve deceleration and stop. How the target speed is changed or a deceleration control pattern is set in this processing is described later with reference to FIG. 5.

(Step 114)

The controller 10 compares the real pulse interval R-SPD corresponding to the current driving speed taken at step 110 with the target pulse interval T-SPD corresponding to the target speed. When R-SPD is larger than T-SPD, the flow proceeds to step 116, or to step 115 otherwise. Since R-SPD and T-SPD are data about the pulse interval, R-SPD longer than T-SPD means that the current speed is lower than the target speed, and R-SPD shorter than T-SPD means that the current speed is higher than the target speed.

(Step 115)

The controller 10 compares R-SPD with T-SPD, and when R-SPD is shorter than T-SPD (that is, when the current driving speed is higher than the target speed), the flow proceeds to step 117, or returns to step 108 otherwise.

(Step 116)

Since it is determined that the current driving speed is lower than the target speed at step 114, the controller 10 performs speed-up processing for increasing the speed of the focusing lens 2. The speed-up processing varies among the types of the lens driving motor 14. In Embodiment 1, since a DC motor is used as the lens driving motor 14, the speed is increased by boosting the voltage supplied to the motor 14.

Specifically, when the current speed is compared with the target speed at step 114, the resulting difference between them is stored, and a voltage increase is determined corresponding to the difference to change the voltage. A larger voltage increase can be set when the difference between the current speed and the target speed is large, and a smaller voltage increase can be set when the difference is small, thereby making it possible to reach the target speed more quickly. If a brake, described later, is being applied, the abovementioned processing is performed after the brake is released.

(Step 117)

Since it is determined that the current driving speed is higher than the target speed at step 115, the controller 10 performs speed-down processing for reducing the speed of the focusing lens 2. Description is made herein for the case where a DC motor is used as the motor 14 and controlled with voltage. In Embodiment 1, the speed is reduced by lowering the voltage supplied to the lens driving motor 14 or applying the brake. This brake is a short brake which involves shorting between the positive terminal and negative terminal of the motor or a reverse brake which involves passage of current such that the direction of the motor rotation is reversed.

Specifically, when the current speed is compared with the target speed at step 115, the resulting difference between them is stored, and it is determined whether the brake is applied or the voltage is reduced on the basis of the difference. For reducing the voltage, a voltage reduction is determined corresponding to the difference to change the voltage. Thus, the pace of speed reduction can be adjusted such that the speed is reduced rapidly by the brake when the difference between the current speed and the target speed is large, while the speed is gradually reduced through voltage control when the difference is small. Consequently, it is possible to reduce the speed to the target speed more quickly.

(Step 118)

The controller 10 determines whether or not the remaining driving amount (FOPC+FPCO)–FPC is equal to zero. When the remaining driving amount is equal to zero, the flow proceeds to step 119. When any remaining driving amount is present, the flow returns to step 108.

(Step 119)

Since the target position is reached, the controller 10 applies the brake to stop the focusing lens 2.

(Step 120)

The controller 10 sets the flag indicating the stop processing is being performed and the flow returns to step 108. Processing after the set of the flag indicating the stop processing is being performed includes monitoring the presence of pulse input with the brake applied and checking whether or not the target position is overrun. When an overrun occurs, the amount thereof is counted and recognized for use in determining whether or not focus detection is again performed.

(Step 121)

The controller 10 reads R-TIM which is the current value (time period) of the pulse interval measuring timer. This R-TIM represents the elapsed time period from the preceding pulse input by the pulse generator 17 to the present time.

(Step 122)

The controller 10 checks the stop processing ongoing flag. When the flag is set, the controller 10 determines that the stop processing is being performed and the flow proceeds to step 123. When the flag is reset, the flow proceeds to step 124.

(Step 123)

Since it is determined that the stop processing is being performed at step 122, the controller 10 compares R-TIM with STOP-TIM. STOP-TIM represents a value (time period) of the pulse interval defined such that it can be determined that the focusing lens 2 is stopped when R-TIM becomes equal to the value or longer. When R-TIM is shorter than STOP-TIM, the flow returns to step 108 to wait for input of a pulse. When R-TIM is equal to or longer than STOP-TIM, the flow proceeds to step 125.

(Step 124)

Since it is determined that the driving is still being performed, the controller 10 compares R-TIM with UP-TIM. When R-TIM is shorter than UP-TIM, the flow returns to step 108 to wait for input of a pulse. When R-TIM is equal to or longer than UP-TIM, the flow proceeds to step 116 to perform the speed-up processing. UP-TIM is a previously set value (time period) of the pulse interval defined such that, when R-TIM becomes equal to the value or longer, the speed-up processing should be performed to prevent the speed from excessively reducing to cause the stop of the focusing lens 2 even while the lens 2 is driven. STOP-TIM and UP-TIM are previously stored in the ROM 10*b*.

(Step 125)

The controller 10 determines that the focusing lens 2 is stopped and performs driving stop processing.

(Step 126)

The processing of the flow is ended. Next, description is made for a subroutine in the processing of setting the target pulse interval performed at step 113 with reference to FIG. 5.

(Step 127)

The controller 10 determines whether or not the remaining driving amount (FOPC+FPCO)–FPC to the target position is equal to or smaller than the deceleration pulse amount. The remaining driving amount is equal to or smaller than the deceleration pulse amount, the flow proceeds to step 128. Otherwise, the target pulse interval setting processing is ended and the flow proceeds to step 114 of the main flow.

(Step 128)

The controller 10 reads a voltage value from the zoom brush 6 to determine whether or not the current position ZOOM of the zooming lens 3 is larger than a predetermined value. The predetermined value represents a previously set focal length of the image-taking optical system. The current position ZOOM of the zooming lens 3 larger than the predetermined value means that the zooming lens 3 is located on the telephoto side closer to the telephoto end than the focal length corresponding to the predetermined value, while the current position ZOOM smaller than the predetermined value means that the zooming lens 3 is located on the wide-angle side closer to the wide-angle end than the focal length corresponding to the predetermined value. When it is determined that the zooming lens 3 is on the telephoto side, the flow proceeds to step 130. On the other hand, when it is determined that the zooming lens 3 is on the wide-angle side, the flow proceeds to step 129.

(Step 129)

Since it is determined that the current focal length is on the wide-angle side at step 128, the controller 10 reads and sets pulse interval data for the target speed (T-SPD) from a wide-angle side deceleration data table (a deceleration control pattern), later described.

(Step 130)

Since it is determined that the current focal length is on the telephoto side at step 128, the controller 10 reads and sets pulse interval data for the target speed (T-SPD) from a telephoto side deceleration data table (a deceleration control pattern), later described.

Figure 6:
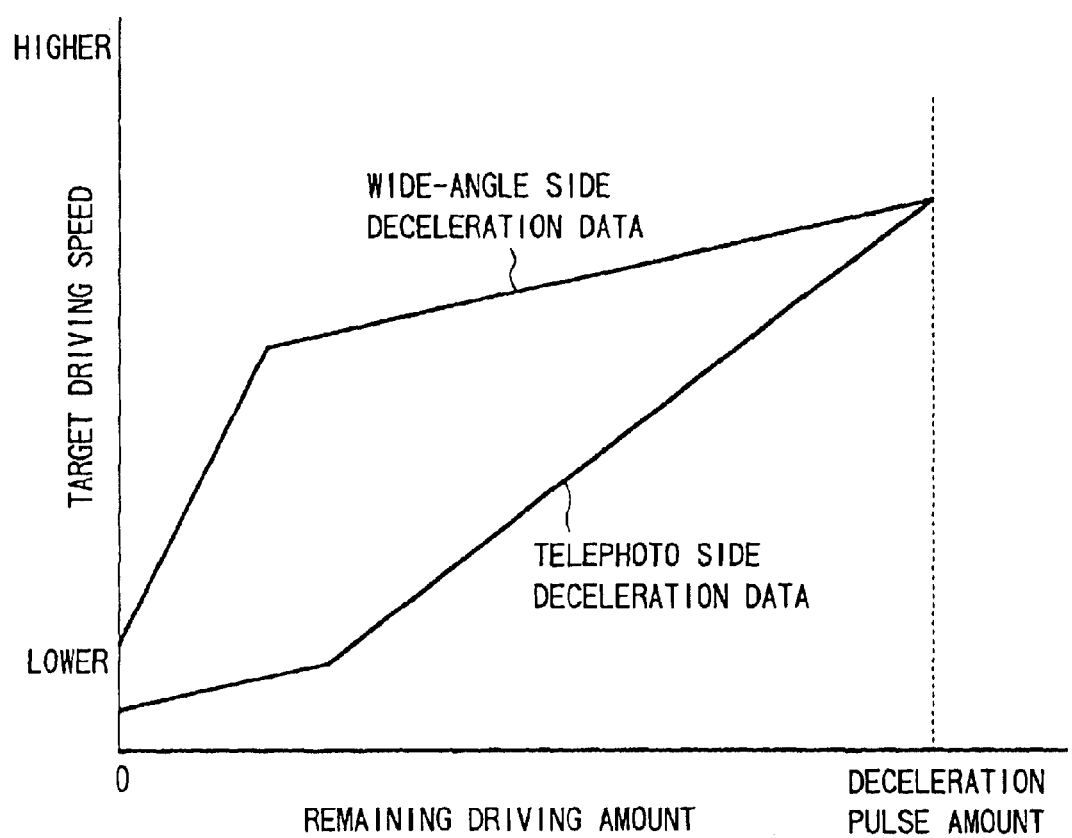
FIG. 6 shows a wide-angle side deceleration data table and a telephoto side deceleration data table in the camera of Embodiment 1.

FIG. 6 shows the wide-angle side deceleration data table and the telephoto side deceleration data table. The horizontal axis represents the remaining driving amount, and the vertical axis represents the target driving speed (pulse interval data). These deceleration data tables are previously stored in the ROM 10*b*. As shown in FIG. 6, in Embodiment 1, the wide-angle side deceleration data table is set such that the deceleration rate to a predetermined remaining amount near the stop position (immediately before the stop) is smaller than on the telephoto side, and after the predetermined remaining amount, the speed is sharply reduced to stop the focusing lens 2.

The setting is made to reduce the driving time even when the target position is overrun. The setting is provided by making use of the fact that the focal depth is deeper on the wide-angle side while the focal depth is shallower on the telephoto side, so that high accuracy of stop position of the focusing lens 2 is required on the telephoto side but relatively lower accuracy is allowed on the wide-angle side as compared with the telephoto side as described earlier.

On the other hand, the telephoto side deceleration data table is set such that the deceleration rate to a predetermined remaining amount near the stop position (immediately before the stop) is large, and after the predetermined remaining amount, the speed is gently reduced to stop the focusing lens 2. This can provide high accuracy of stop position of the focusing lens 2 on the telephoto side.

The predetermined value serving as a threshold value for the determination whether or not the focal length is on the wide-angle side or telephoto side at step 128 is set on condition that a defocus amount on an image-pickup surface due to an overrun possibly caused when the focusing lens 2 is stopped in accordance with the wide-angle side deceleration data does not exceed the permissible circle of confusion.

As described above, in Embodiment 1, the speed control data for the deceleration control (deceleration control pattern) is changed depending on the focal length of the image-taking optical system. Thus, high accuracy of stop position of the focusing lens 2 can be maintained on the telephoto side and the required accuracy of stop position can be relaxed to stop the driving more quickly on the wide-angle side, thereby allowing a reduction in driving time of the focusing lens 2.

While one focal length for changing the deceleration data table is set in Embodiment 1, a plurality of focal lengths for changing the deceleration data table may be set (for example, an additional deceleration data table is provided corresponding to an intermediate focal length between the telephoto side and the wide-angle side) to set speed control data for deceleration in more detail. It is thus possible to maintain the accuracy of stop position required for each focal length as well as to minimize the driving time.

While Embodiment 1 has been described for the case where the DC motor is used as the lens driving motor to achieve acceleration and deceleration through voltage control, a vibration type motor may be used in which periodic wave voltages with two different phases are applied to piezoelectric elements to excite vibration of a vibrator such that a contact body is relatively moved. In this case, acceleration or deceleration is performed by changing the frequencies, voltage values, or a phase difference of periodic wave voltages.

(Embodiment 2)

Figure 7:
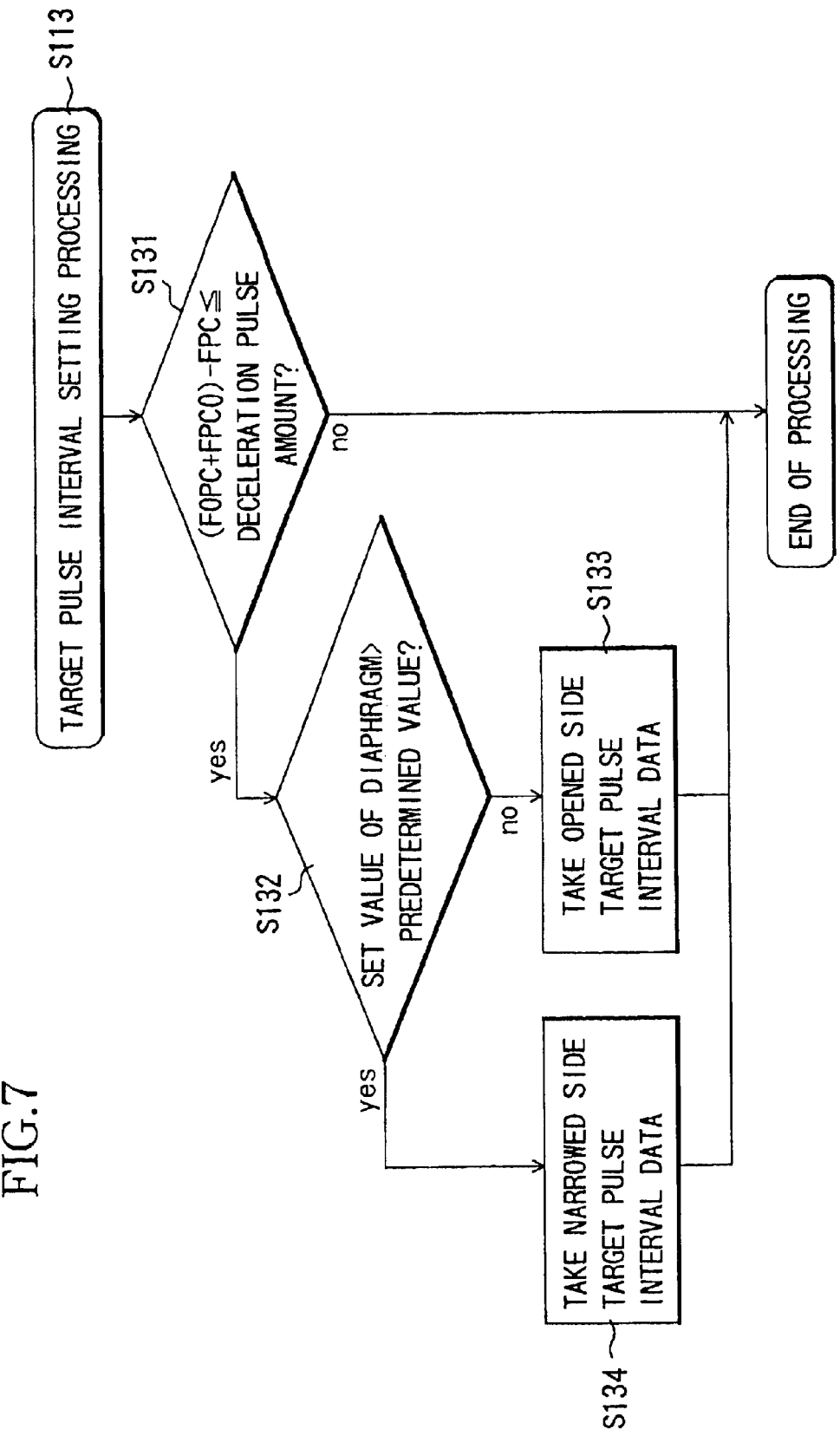
FIG. 7 is a flow chart for explaining processing of a camera which is Embodiment 2 of the present invention.

Description is made for autofocus operation in a digital camera with a built-in lens which is Embodiment 2 of the present invention with reference to FIGS. 2 to 5 and FIG. 7. Since the processing shown in FIGS. 2 to 5 is already described, the description thereof is omitted, and only the processing of a flow chart in FIG. 7 is hereinafter described.

The structure of the camera to which Embodiment 2 is applied is the same as the camera of Embodiment 1.

FIG. 7 shows the flow chart of a subroutine in the target pulse interval setting (step 113) in FIG. 1.

(Step 131)

The controller 10 determines whether or not the remaining driving amount represented by (FOPC+FPCO)−FPC to the target position is equal to or smaller than the deceleration pulse amount. When the remaining driving amount is equal to or smaller than the deceleration pulse amount, the flow proceeds to step 132. Otherwise, the target pulse interval setting is ended and the flow proceeds to step 114 of the main flow.

(Step 132)

The controller 10 reads the current set value (F-number) of the diaphragm 4 to determine whether or not the set value is larger than a predetermined value. A set value of the diaphragm 4 larger than the predetermined value indicates that the aperture of the diaphragm 4 is narrowed down further than the aperture corresponding to the predetermined value, and a set value of the diaphragm 4 smaller than the predetermined value indicates that the aperture of the diaphragm 4 is opened wider than the aperture corresponding to the predetermined value. When it is determined that the diaphragm 4 is on the opened side, the flow proceeds to step 133. When it is determined that the diaphragm 4 is on the narrowed side, the flow proceeds to step 134.

(Step 133)

Since it is determined that the diaphragm 4 is on the opened side at step 132, the controller 10 reads and sets a target pulse interval data (T-SPD) for the target speed from an opened side deceleration data table (a deceleration control pattern), later described.

(Step 134)

Since it is determined that the diaphragm 4 is on the narrowed side at step 132, the controller 10 reads and sets a target pulse interval data (T-SPD) for the target speed from a narrowed side deceleration data table (a deceleration control pattern), later described.

Figure 8:
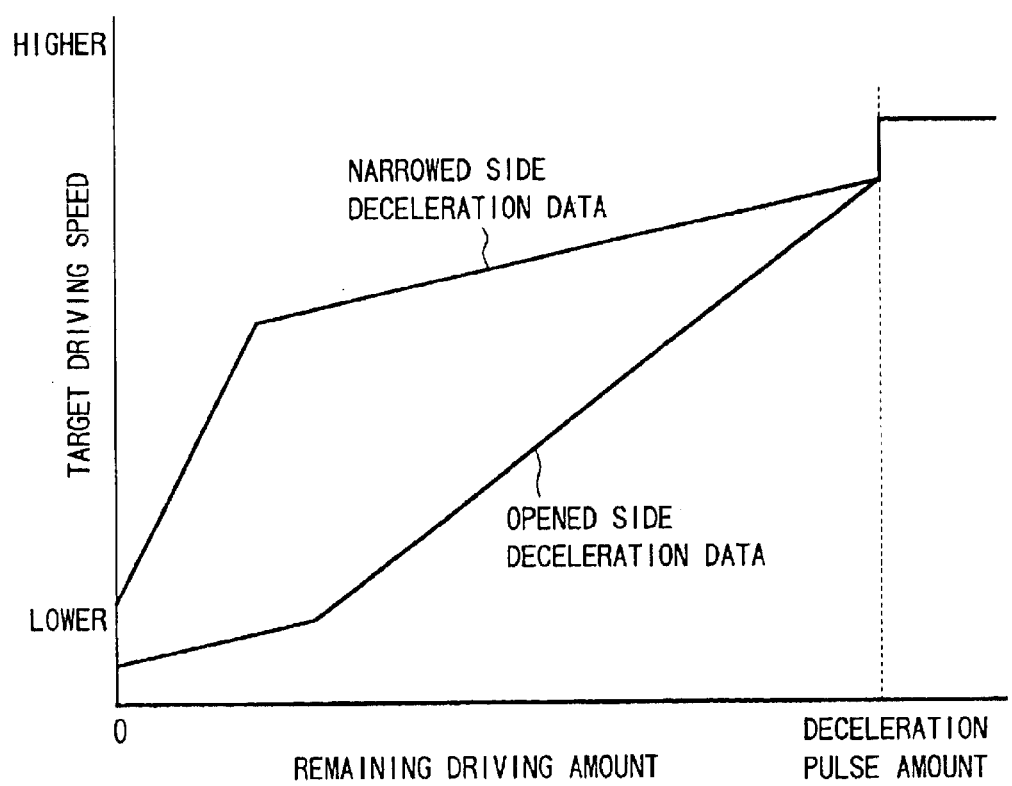
FIG. 8 shows a diaphragm opened side deceleration data table and a diaphragm narrowed side deceleration data table in the camera of Embodiment 2.

FIG. 8 shows the opened side deceleration data table and the narrowed side deceleration data table. The horizontal axis represents the remaining driving amount, and the vertical axis represents the target speed (the pulse interval). These deceleration data tables are previously saved in the ROM 10b. As shown in FIG. 8, in Embodiment 2, the narrowed side deceleration data table is set such that the deceleration rate to a predetermined remaining amount near the stop position (immediately before the stop) is smaller than on the opened side, and after the predetermined remaining amount, the speed is sharply reduced to stop the focusing lens 2.

The setting is made to reduce the driving time even when the target position is overrun. The setting is provided by making use of the fact that the focal depth is deeper on the narrowed side while the focal depth is smaller on the opened side, so that high accuracy of stop position of the focusing lens 2 is required on the opened side but relatively lower accuracy is allowed on the stopped-down narrowed side as compared with the opened side.

On the other hand, the opened side deceleration data table is set such that the deceleration rate to a predetermined remaining amount near the stop position (immediately before the stop) is large, and after the predetermined remaining amount, the speed is gently reduced to stop the focusing lens 2. This can provide high accuracy of stop position of the focusing lens 2 on the opened side.

The predetermined value serving as a threshold value for the determination whether or not the diaphragm 4 is on the opened side or narrowed side at step 123 is set on condition that a defocus amount on an image pickup surface due to an overrun possibly caused when the focusing lens 2 is stopped in accordance with the narrowed side deceleration data does not exceed the permissible circle of confusion.

As described above, in Embodiment 2, speed control data for the deceleration control (deceleration control pattern) is changed depending on the set value of the diaphragm 4. Thus, high accuracy of stop position of the focusing lens 2 can be maintained on the opened side, and the required accuracy of stop position can be relaxed to stop the driving more quickly on the narrowed side, thereby allowing a reduction in driving time of the focusing lens 2.

While one set value of the diaphragm is set for changing the deceleration data table in Embodiment 2, a plurality of set values for changing the deceleration data table may be set (for example, an additional deceleration data table is provided corresponding to an intermediate set value of the diaphragm between the opened side and the narrowed side) to set speed control data for deceleration in more detail. It is thus possible to maintain the accuracy of stop position required for each set value of the diaphragm as well as to minimize the driving time.

While Embodiment 2 has been described for the case where the DC motor is used as the lens driving motor to achieve acceleration and deceleration through voltage control, a vibration type motor may be used in which periodic wave voltages with two different phases are applied to piezoelectric elements to excite vibration of a vibrator such that a contact body is relatively moved. In this case, acceleration or deceleration is performed by changing the frequencies, voltage values, or a phase difference of the periodic wave voltages.

(Embodiment 3)

Figure 9:
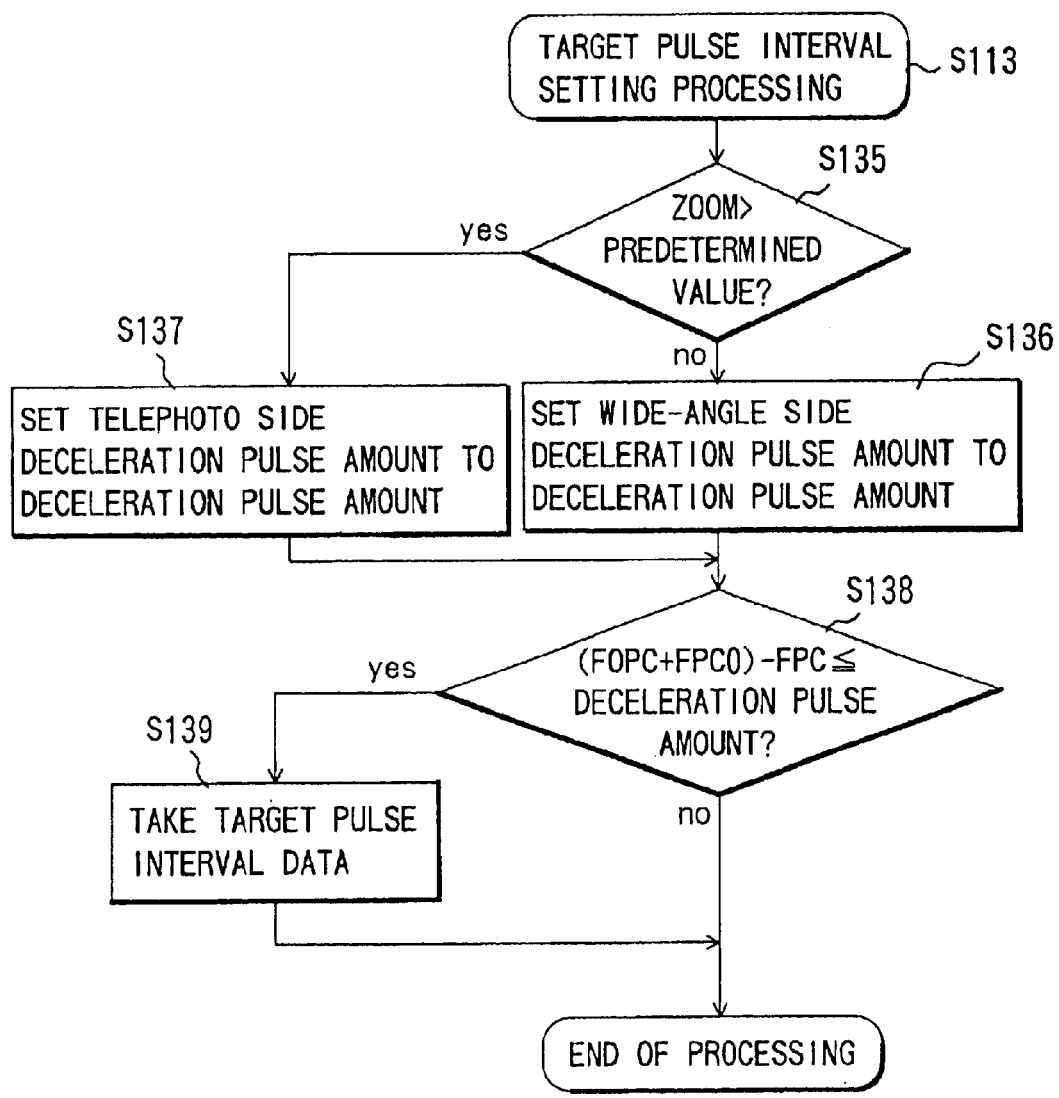
FIG. 9 is a flow chart for explaining the processing of the camera of Embodiment 1.

Description is made for autofocus operation in a digital camera with a built-in lens which is Embodiment 3 of the present invention with reference to FIGS. 2 to 5 and FIG. 9. Since the processing shown in FIGS. 2 to 5 is already described, the description thereof is omitted, and only the processing of a flow chart in FIG. 9 is hereinafter described.

The structure of the camera to which Embodiment 3 is applied is the same as the camera of Embodiment 1.

FIG. 9 shows the flow chart of a subroutine in the target pulse interval setting (step 113) in FIG. 3.

(Step 135)

The controller 10 reads a voltage value from the zoom brush 6 to determine whether or not the current position ZOOM of the zooming lens 3 is larger than a predetermined value. The predetermined value represents a previously set focal length of the image-taking optical system. The current position larger than the predetermined value means that the zooming lens 3 is located on the telephoto side closer to the telephoto end than the focal length corresponding to the predetermined value, while the current position smaller than the predetermined value means that the zooming lens 3 is located on the wide-angle side closer to the wide-angle end than the focal length corresponding to the predetermined value. When it is determined that the zooming lens 3 is located on the telephoto side, the flow proceeds to step 137. When it is determined that the zooming lens 3 is located on the wide-angle side, the flow proceeds to step 136.

(Step 136)

Since it is determined that the current focal length is on the wide-angle side at step 135, the controller 10 sets a telephoto side deceleration pulse amount (a predetermined value) as a deceleration pulse amount.

(Step 137)

Since it is determined that the current focal length is on the telephoto side, the controller 10 sets a wide-angle side deceleration pulse amount (a predetermined value) as the deceleration pulse amount. These telephoto side and wide-angle side deceleration pulse amounts are described later.

(Step 138)

The controller 10 determines whether or not the remaining driving amount represented by (FOPC+FPCO)−FPC to the target position is equal to or smaller than the deceleration pulse amount set at step 136 or step 137. When it is determined that the remaining driving amount is equal to or smaller than the deceleration pulse amount, the flow proceeds to step 139. Otherwise, the target pulse interval setting is ended and the flow proceeds to step 114 of the main flow of FIG. 3.

(Step 139)

Since it is determined that the remaining driving amount is equal to or smaller than the deceleration pulse amount, the controller 10 newly takes T-SPD for changing the target speed. In this manner, when the remaining driving amount is equal to or smaller than the deceleration pulse amount, the deceleration control is stated to the update the target speed such that the focusing lens 2 is stopped at the target position.

Figure 10:
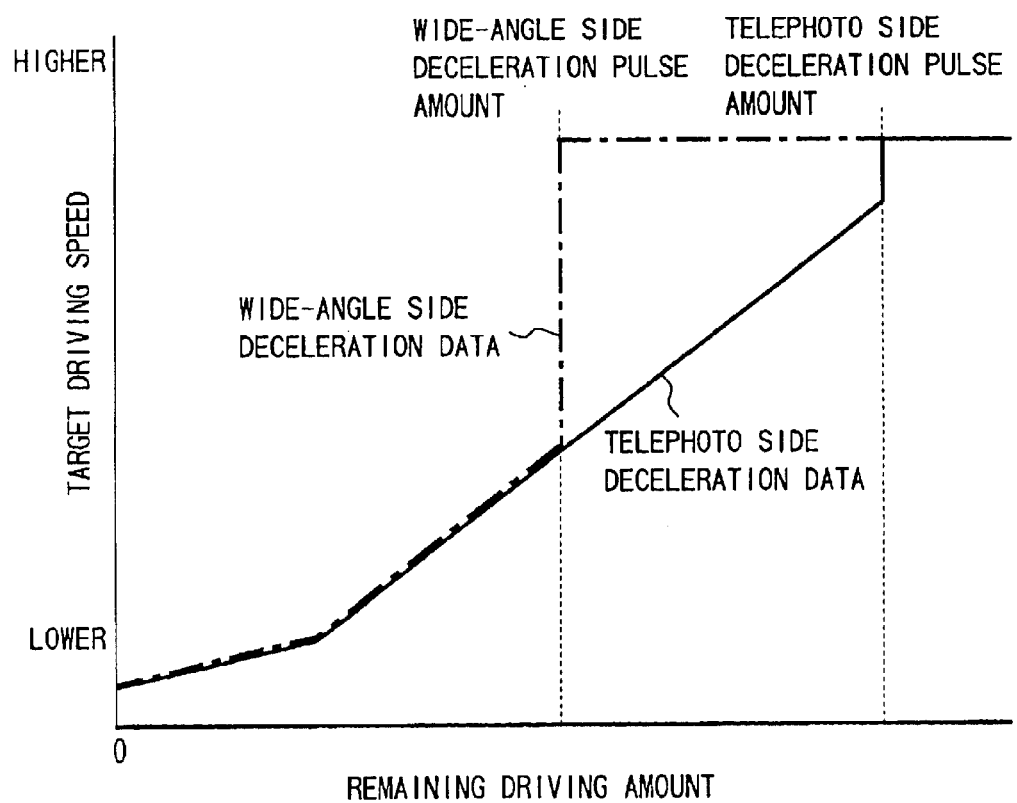
FIG. 10 shows a wide-angle and a telephoto side deceleration pulse and a wide-angle and a telephoto side deceleration data table in the camera of Embodiment 3.

FIG. 10 shows the wide-angle side deceleration pulse amount and the telephoto side deceleration pulse amount. The horizontal axis represents the remaining driving amount, and the vertical axis represents the target speed (the pulse interval). The deceleration pulse data are previously stored in the ROM 10*b*.

As shown in FIG. 10, in Embodiment 3, the wide-angle side deceleration pulse amount (the predetermined value) is set such that the deceleration control is started from a smaller remaining driving amount than on the telephoto side, so that the speed is sharply reduced to stop the focusing lens 2 in actual operation.

The setting is made to reduce the driving time even when the target position is overrun. The setting is provided by making use of the fact that the focal depth is deeper on the wide-angle side while the focal depth is shallower on the telephoto side, so that high accuracy of stop position of the focusing lens 2 is required on the telephoto side but relatively lower accuracy is allowed on the wide-angle side as compared with the telephoto side as described earlier.

On the other hand, the telephoto side deceleration pulse amount (the predetermined value) is set such that the deceleration control is started from a larger remaining driving amount. Thus, the speed is gently reduced to stop the focusing lens 2 in actual operation. This can achieve high accuracy of stop position of the focusing lens on the telephoto side.

The predetermined value serving as a threshold value for the determination whether or not the focal length is on the wide-angle side or telephoto side at step 135 is set on condition that a defocus amount on an image-pickup surface due to an overrun possibly caused when the focusing lens 2 is stopped in accordance with the wide-angle side deceleration data (deceleration pulse amount) does not exceed the permissible circle of confusion.

As described above, in Embodiment 3, the remaining driving amount at which the deceleration control is started is changed depending on the focal length of the image-taking optical system. Thus, high accuracy of stop position of the focusing lens 2 can be maintained on the telephoto side and the required accuracy of stop position can be relaxed to stop the driving more quickly on the wide-angle side, thereby allowing a reduction in driving time of the focusing lens 2.

While one focal length for changing the deceleration pulse amount is set in the deceleration control of Embodiment 3, a plurality of focal lengths for changing the deceleration pulse amount may be set (for example, an additional deceleration pulse is provided corresponding to an intermediate focal length between the telephoto side and the wide-angle side) to set speed control data for deceleration in more detail. It is thus possible to maintain the accuracy of stop position required for each focal length as well as to minimize the driving time.

While Embodiment 3 has been described for the case where the DC motor is used as the lens driving motor to achieve acceleration and deceleration through voltage control, a vibration type motor may be used in which periodic wave voltages with two different phases are applied to piezoelectric elements to excite vibration of a vibrator such that a contact body is relatively moved. In this case, acceleration or deceleration is performed by changing the frequencies, voltage values, or a phase difference of the periodic wave voltages.

It is possible to combine the control for changing the deceleration data table depending on the focal length described earlier in Embodiment 1 with the control for changing the remaining driving amount (deceleration pulse amount) at which the deceleration control is started depending on the focal length described in Embodiment 3.

Although detailed description is omitted, similarly to Embodiment 2, the remaining driving amount (deceleration pulse amount) at which the deceleration control is started can be changed depending on the set value of the diaphragm (such that the remaining driving amount at which the deceleration control is started on the narrowed side is smaller than the remaining driving amount at which the deceleration control is started on the opened side).

It is also possible to combine the control for changing the deceleration data table depending on the set value of the diaphragm described in Embodiment 2 with the abovementioned control for changing the remaining driving amount at which the deceleration control is started depending on the set value of the diaphragm.

(Embodiment 4)

Figure 11:
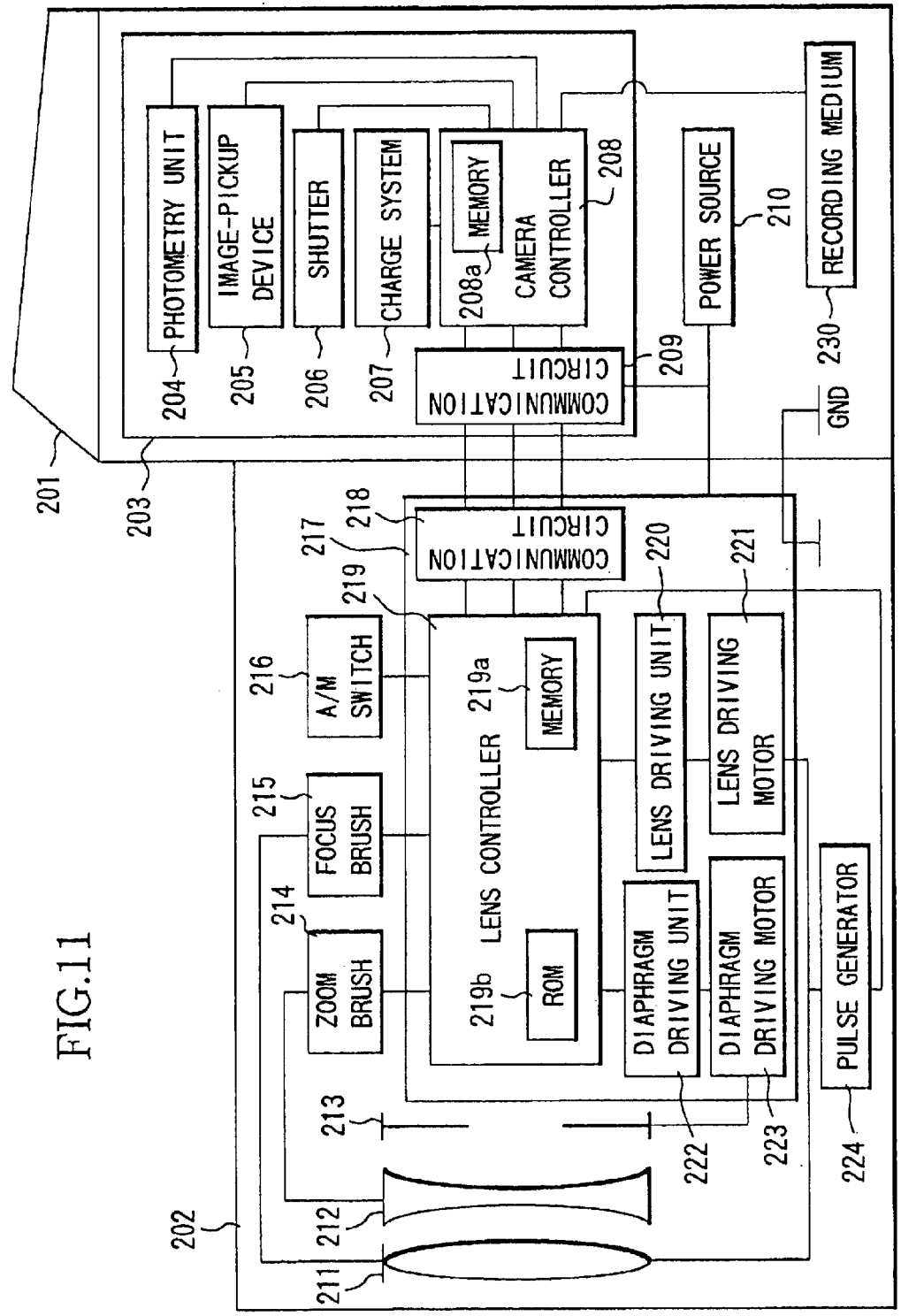
FIG. 11 is a block diagram showing a camera system which is Embodiment 4 of the present invention.

FIG. 11 shows a digital camera system which is Embodiment 4 of the present invention to be described. The camera system is formed of a digital camera and an image-taking lens (a lens apparatus) which is removably mounted on the camera.

In FIG. 11, reference numeral 201 shows the digital camera, and reference numeral 202 shows the image-taking lens which is removably mounted on the camera 201.

In the camera 201, reference numeral 203 shows an electric circuit. The electric circuit 203 comprises a photometry unit 204 which measures an amount of light passing through an image-taking optical system in the image-taking lens 202, a shutter 206 which controls the exposure time of an image-pickup device 205, a charge system 207 which performs charge driving of the shutter 206, a camera controller 208 which is responsible for various types of control in the camera 201 and formed of a CPU, an MPU or the like, and a communication circuit 209 which performs serial communication with the image-taking lens 202. The camera 201 includes an electric power source 210 which also supplies electric power to the image-taking lens 202.

The image-pickup device 205 is formed of a photoelectric conversion element such as a CCD and a CMOS sensor which photoelectrically converts an object image formed by the image-taking optical system. Signals output from the image-pickup device 205 are converted into image signals after undergoing various types of processing by an image processing circuit, not shown, included in the camera controller 208. The image signals are displayed on an electric viewfinder, not shown, or recorded on a recording medium 230 such as a semiconductor memory, a magnetic disk, or an optical disk.

The camera controller 208 detects the focusing state of the image-taking optical system with Phase Difference Detection Method or the like based on signals from a plurality of image-pickup areas on the image-pickup device 205 (this operation is hereinafter referred to as "focus detection") and makes calculations of an amount or a direction of driving of a focusing lens 211 to focus the image-taking optical system on an object.

In the image-taking lens 202, 212 a zooming lens, and 213 a diaphragm.

The image-taking lens 202 has the image-taking optical system including the focusing lens 211, the zooming lens 212, and the diaphragm 213.

Reference numeral 214 shows a zoom brush which slides over a resistor, not shown, in association with movement of the zooming lens 212 to detect the position of the zooming lens 212. A signal with a voltage value corresponding to the position of the zooming lens 212 is output from the zoom brush 214. Reference numeral 215 shows a focus brush which slides over a resistor, not shown, in association with movement of the focusing lens 211 to detect the position (zone) of the focusing lens 211. A signal with a voltage value corresponding to the position of the focusing lens 211 is output from the focus brush 215.

Reference numeral 216 shows an A/M switch for switching between autofocus and manual focus. Reference numeral 217 shows an electric circuit in the image-taking lens 202.

The electric circuit 217 comprises a communication circuit 218 which performs serial communication with the camera 201, a lens controller 219 which is responsible for control in the image-taking lens 202 and formed of a CPU, an MPU, or the like, a lens driving unit 220 which controls driving of a focus driving motor 221 for driving the focusing lens 211 in response to a control signal from the lens controller 219, and a diaphragm driving unit 222 which controls driving of a diaphragm driving motor 223 for driving the diaphragm 213 in response to a control signal from the lens controller 219. In the image-taking lens 202, a pulse generator 224 is provided for outputting a pulse signal in association with movement of the focusing lens 211. The pulse generator 224 is similar to the pulse generator 17 described in Embodiment 1.

Next, description is made for autofocus operation in the camera system of Embodiment 4 with reference to flow charts of FIGS. 12 to 15.

Figure 12:
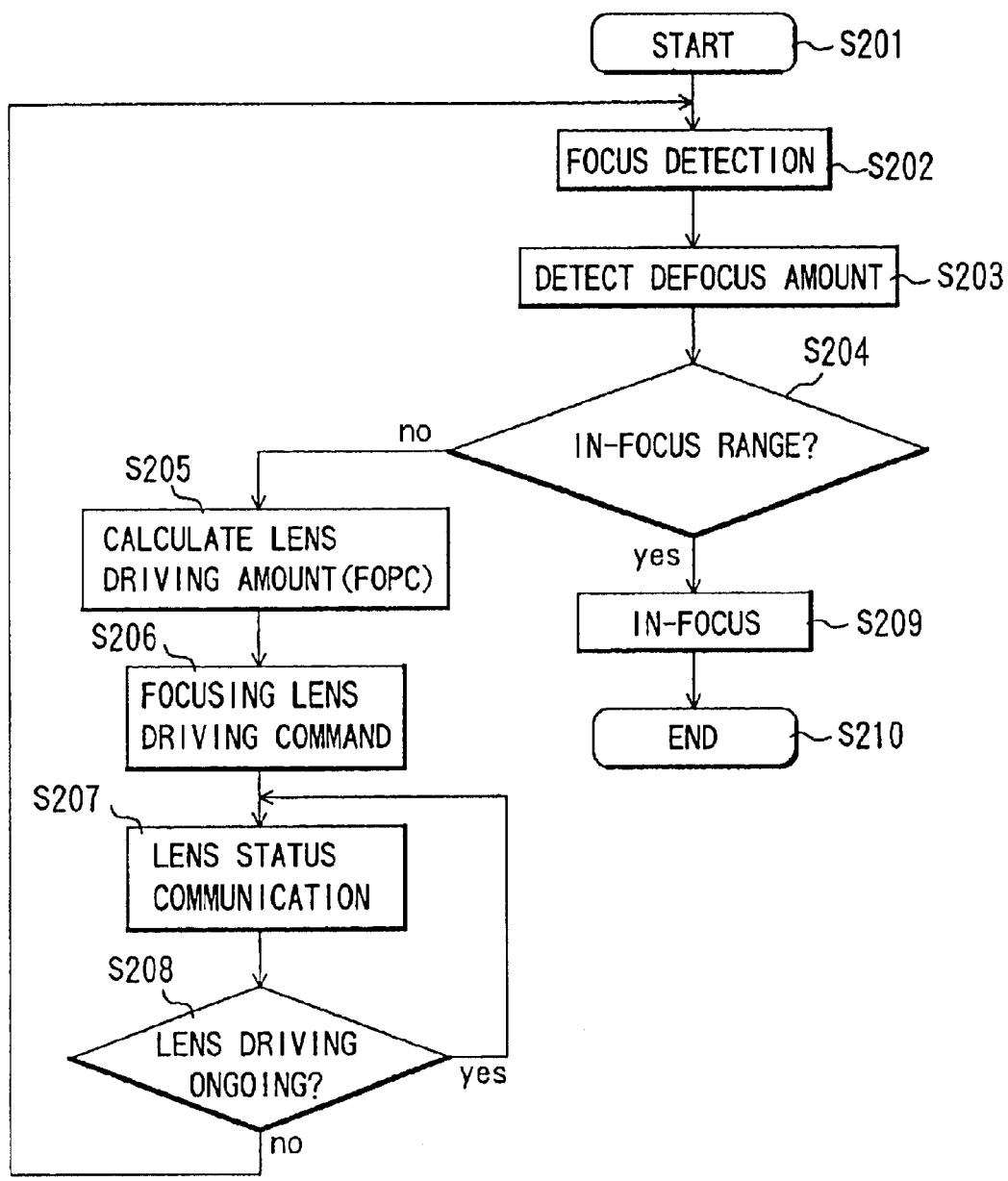
FIG. 12 is a flow chart for explaining processing on the camera side in Embodiment 4.
Figure 13A:
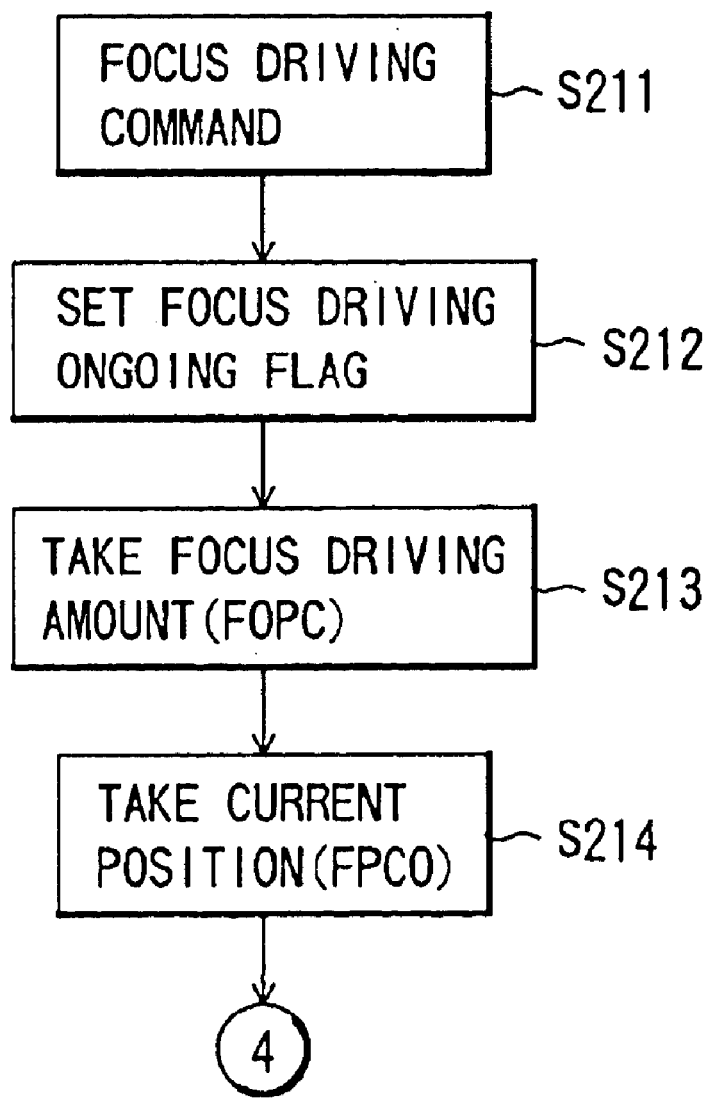
FIGS. 13A and 13B are flow charts for explaining processing on the image-taking lens side in Embodiment 4.
Figure 13B:
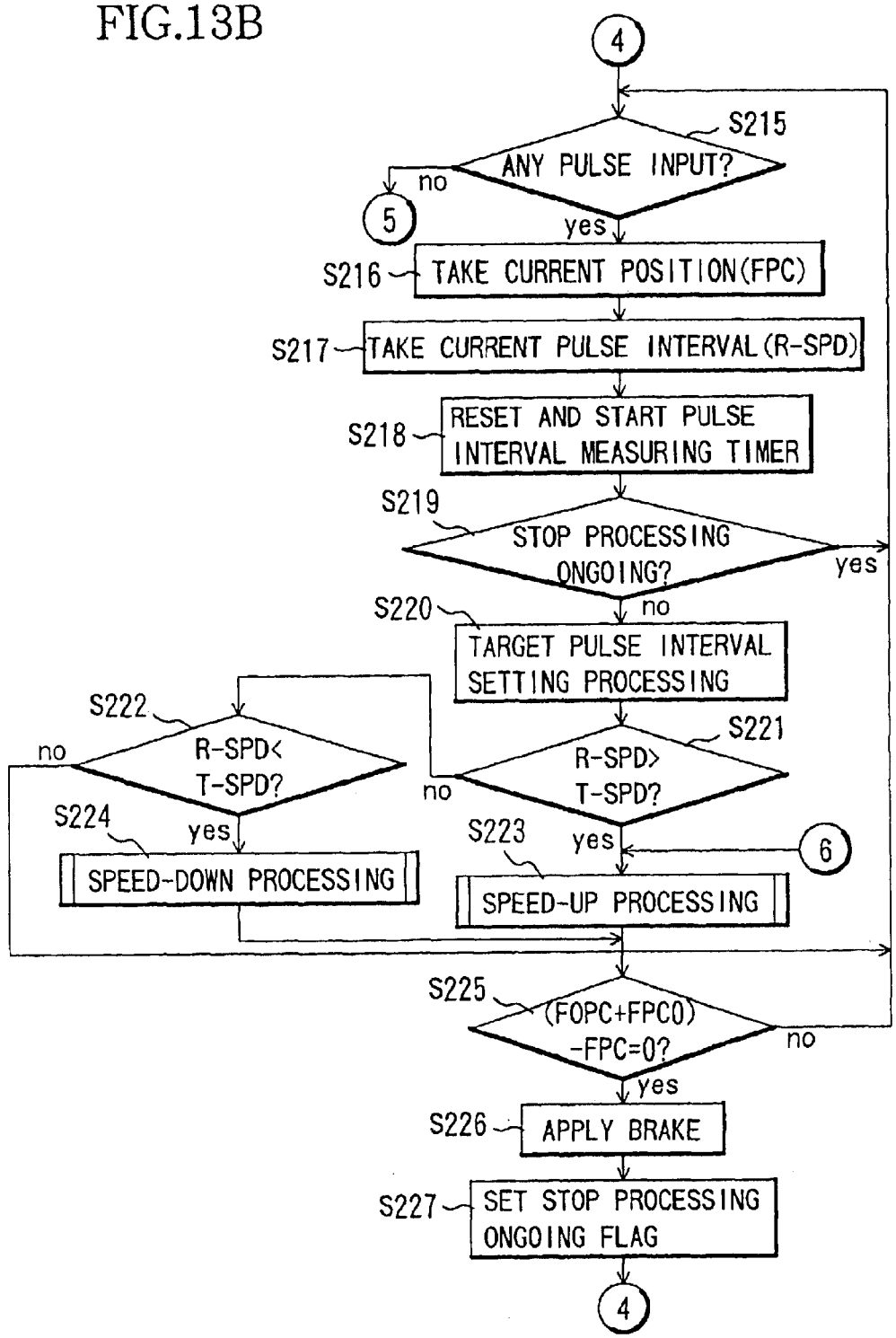
Figure 14:
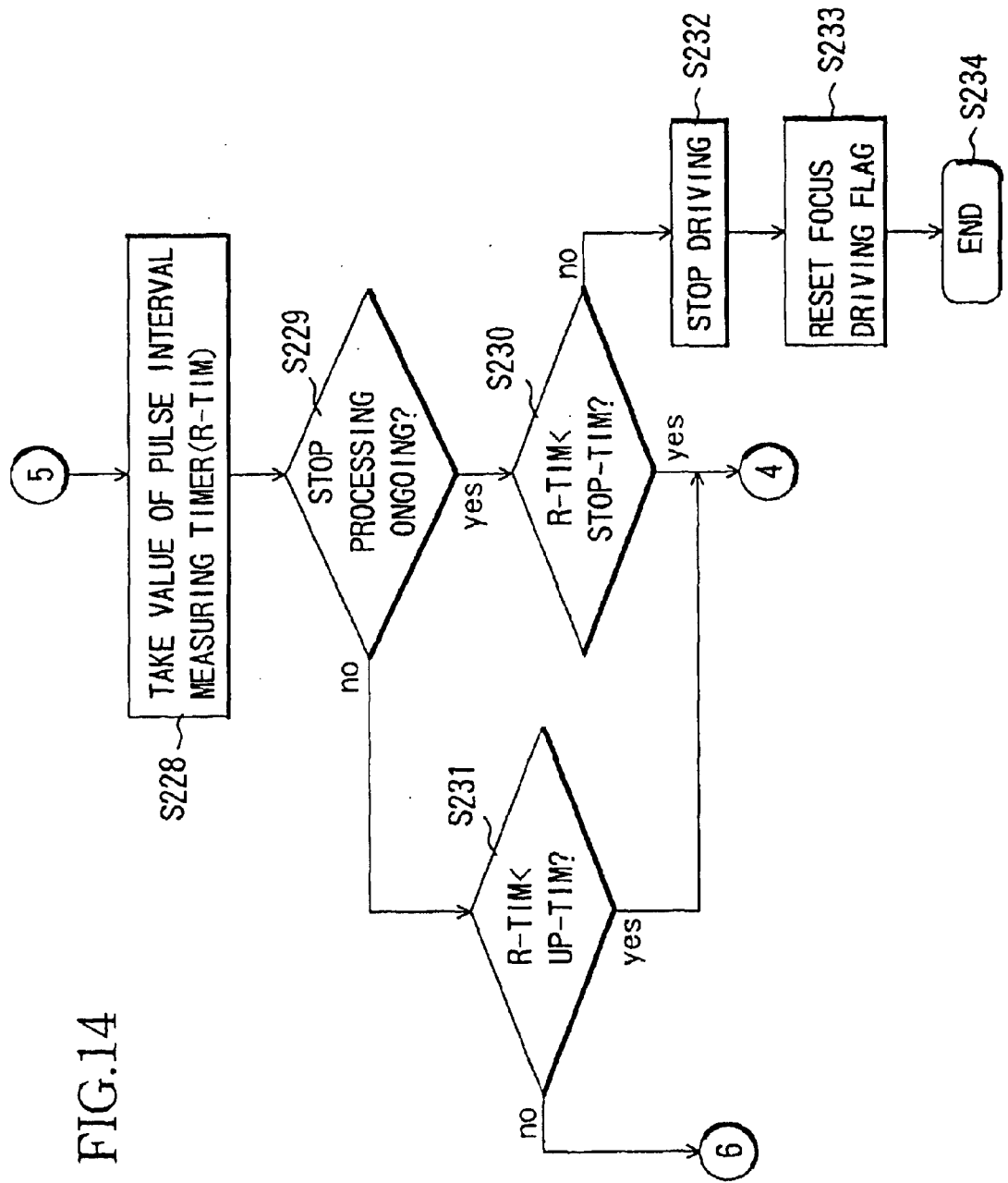
FIG. 14 is a flow chart for explaining the processing on the image-taking lens side in Embodiment 4.

First, with reference to FIG. 12, description is made for processing performed on the camera side (mainly by the camera controller 208) in the camera system of Embodiment 4.

(Step 201)

When an image-taking preparation switch, not shown, is on-operated, the camera controller 208 starts the processing in the flow.

(Step 202)

The camera controller 208 detects the focusing state of the image-taking optical system (focus detection) based on signals from a plurality of image-pickup areas on the image-pickup device 205.

(Step 203)

The camera controller 208 calculates a defocus amount from the focus detection result obtained at step 202.

(Step 204)

The camera controller 208 determines whether or not the defocus amount calculated at step 203 falls within an in-focus range. If it falls within the in-focus range, the flow proceeds to step 209. If it is out of the in-focus range, the flow proceeds to step 205. The in-focus range is defined on the basis that the defocus amount falls within the permissible circle of confusion.

(Step 205)

The camera controller 206 calculates a driving amount by which the focusing lens 211 should be driven to an in-focus position (a target position) from the defocus amount calculated at step 203. The driving amount is calculated as the amount of a pulse signal generated by the pulse generator 224. The driving amount is saved as FOPC in a memory 208 formed of an EEPROM, for example, provided in the camera controller 208.

(Step 206)

The camera controller 208 outputs a focus driving command to the lens controller 219 to drive the focus driving motor 221 by the driving amount FOPC calculated at step 205 with communication through the communication circuits 209 and 218.

(Step 207)

The camera controller 208 performs lens status communication with the lens controller 219. With this communication, the camera controller 208 is notified of the driving state of the focusing lens 211 or the like on the lens side.

(Step 208)

The camera controller 208 determines from the lens status communication performed at step 207 whether or not the focusing lens 211 is being driven. When the focusing lens 211 is being driven, the flow returns to step 207. When the focusing lens 211 is not driven, the flow returns to step 202.

(Step 209)

Since it is determined that the defocus amount falls within the in-focus range at step 203, the camera controller 208 performs focus processing.

(Step 210)

The camera controller 208 ends the processing on the camera side before focusing is achieved.

In this manner, on the side of the camera 201, the focus detection and focusing lens driving are repeatedly performed until the defocus amount falls within the in-focus range.

Next, description is made for processing performed on the side of the image-taking lens 202 (mainly by the lens controller 219) with reference to FIGS. 13A, 13B to 15. In these figures, the same circled numbers show links in the flows.

(Step 211)

The lens controller 219 receives a focus driving command from the camera controller 208 with camera-lens communication.

(Step 212)

The lens controller 219 sets a focus driving ongoing flag, the state of which is one of information to be transmitted through lens status communication in camera-lens communication. During the setting of the flag, the camera controller 208 determines that the focusing lens 211 is being driven.

(Step 213)

The lens controller 219 saves the focus driving amount (FOPC) transmitted from the camera controller 208 at step 211 in a memory 219a formed of an EEPROM, for example provided in the lens controller 219.

(Step 214)

The lens controller 219 reads the current pulse count value and saves the read value as FPCO in the memory 219a. The pulse signal output from the pulse generator 224 is counted by the lens controller 219 such that the lens controller 219 can read it as a pulse count value. In addition, a pulse interval measuring timer is provided for measuring an elapsed time period from the preceding pulse signal input at the time of pulse signal input to measure the pulse interval.

(Step 215)

The lens controller 219 determines whether or not a pulse signal is input thereto from the pulse generator 224. When a pulse signal is input, the flow proceeds to step 216. When no pulse signal is input, the flow proceeds to step 228.

(Step 216)

Since it is determined that a pulse signal is input at step 215, the pulse count value indicating the current position of the focusing lens 211 has been changed. Thus, the lens controller 219 takes a pulse count value FPC indicating the current position.

(Step 217)

Since it is determined that a pulse signal is input at step 215, the lens controller 219 reads the measured value of the pulse interval (R-SPD) of the pulse signal output from the pulse generator 224.

(Step 218)

The lens controller 219 resets and restarts the value of the pulse interval measuring timer so that, when a pulse signal is input next, the measured value of the pulse interval can be obtained.

(Step 219)

The lens controller 219 checks a stop processing ongoing flag. When the flag is set, it is determined that stop processing is being performed and the flow returns to step 215. When the flag is reset, the flow proceeds to step 220.

(Step 220)

The lens controller 219 performs setting of a target driving speed. Specifically, the lens controller 219 determines whether or not the remaining driving amount to the target stop position represented by (FOPC+FPCO)−FPC is equal to or smaller than the amount of predetermined deceleration pulse amount, at the start of which deceleration is to be started. When the remaining driving amount is equal to or smaller than the deceleration pulse amount, the lens controller 219 newly takes T-SPD to change the target speed. Specifically, when the remaining driving amount is equal to or smaller than the deceleration pulse amount, the target speed is updated to achieve deceleration and stop.

(Step 221)

The lens controller 219 compares the pulse interval R-SPD which indicates the current driving speed taken at step 217 with the pulse interval T-SPD which indicates the target speed. When R-SPD is longer, the flow proceeds to step 223, or to step 222 otherwise. Since R-SPD and T-SPD are data about the pulse interval, R-SPD longer than T-SPD means that the current speed is lower than the target speed.

(Step 222)

The lens controller 219 compares R-SPD with T-SPD, and when R-SPD is shorter, that is, the current speed is higher than the target speed, the flow proceeds to step 224, or returns to step 215 otherwise.

(Step 223)

Since it is determined that the current driving speed is lower than the target speed at step 221, the lens controller 219 performs speed-up processing for increasing the speed of the focusing lens 211. The speed-up processing varies among the types of the lens driving motor 221. In Embodiment 4, since a DC motor is used as the lens driving motor 221, the speed is increased by boosting the voltage supplied to the motor 221.

Specifically, when the current speed is compared with the target speed at step 221, the resulting difference between them is stored, and a voltage increase is determined corresponding to the difference to change the voltage. Thus, a larger voltage increase can be set when the difference between the current speed and the target speed is large, and a smaller voltage increase can be set when the difference is small, thereby making it possible to reach the target speed more quickly. If a brake (a short brake or a reverse brake) is being applied, the abovementioned processing is performed after the brake is released.

(Step 224)

Since it is determined that the current driving speed is higher than the target speed at step 222, the lens controller 219 performs speed-down processing for reducing the speed of the focusing lens 211.

Description is made herein for the case where a DC motor is used as the motor 221 and controlled with voltage. In Embodiment 4, the speed is reduced by lowering the voltage supplied to the lens driving motor 221 or applying the brake.

Specifically, when the current speed is compared with the target speed at step 221, the resulting difference between them is stored, and it is determined whether the brake is applied or the voltage is reduced on the basis of the difference. For reducing the voltage, a voltage reduction is determined corresponding to the difference to change the voltage. Thus, the pace of speed reduction can be adjusted such that the speed is reduced rapidly by the brake when the difference between the current speed and the target speed is large, while the speed is gradually reduced through voltage control when the difference is small. Consequently, it is possible to reduce the speed to the target speed more quickly.

(Step 225)

The lens controller 219 determines whether or not the remaining driving amount (FOPC+FPCO)−FPC is equal to zero. When the remaining driving amount is equal to zero, the flow proceeds to step 226. When any remaining driving amount is present, the flow returns to step 215.

(Step 226)

Since the target position is reached, the lens controller 219 applies the brake to stop the focusing lens 211 (the focus driving motor 221).

(Step 227)

The lens controller 219 sets the flag indicating the stop processing is being performed and the flow returns to step 215. Processing after the set of the flag indicating the stop processing is being performed includes monitoring the presence of pulse input with the brake applied and checking whether or not the target position is overrun. When an overrun occurs, the amount thereof is counted and recognized for use in determining whether or not focus detection is again performed.

(Step 228)

The lens controller 219 reads R-TIM which is the current value of the pulse interval measuring timer. This R-TIM represents the elapsed time period from the preceding pulse input to the present time.

(Step 229)

The lens controller 219 checks the stop processing ongoing flag. When the flag is set, the lens controller 219 determines that the stop processing is being performed and the flow proceeds to step 230. When the flag is reset, the flow proceeds to step 231.

(Step 230)

Since it is determined that the stop processing is being performed at step 229, the lens controller 219 compares R-TIM with STOP-TIM. STOP-TIM represents a value (time period) of the pulse interval defined such that it can be determined that the focusing lens 211 is stopped when R-TIM becomes equal to the value or longer.

When R-TIM is shorter than STOP-TIM, the flow returns to step 215 to wait for input of a pulse. When R-TIM is equal to or longer than STOP-TIM, the flow proceeds to step 232.

(Step 231)

Since it is determined that the driving is still being performed, the lens controller 219 compares R-TIM with UP-TIM. When R-TIM is shorter than UP-TIM, the flow returns to step 215 to wait for input of a pulse. When R-TIM is equal to or longer than UP-TIM, the flow proceeds to step 223 to perform the speed-up processing. UP-TIM represents a value of the pulse interval defined such that, when R-TIM becomes equal to the value or longer, the speed-up processing should be performed to prevent the speed from excessively reducing to cause the stop of the focusing lens 211 even while the focusing lens 211 is driven. STOP-TIM and UP-TIM are previously stored in a ROM 219b provided in the lens controller 219.

(Step 232)

The lens controller 219 determines that the focusing lens 211 is stopped to perform driving stop processing.

(Step 233)

The lens controller 219 resets the focus driving ongoing flag, the state of which is one of information to be transmitted through lens status communication in camera-lens communication. During the setting of the flag, the camera controller 208 determines that the focusing lens 211 is being driven on the camera side.

(Step 234)

The processing of the flow is ended.

Figure 15:
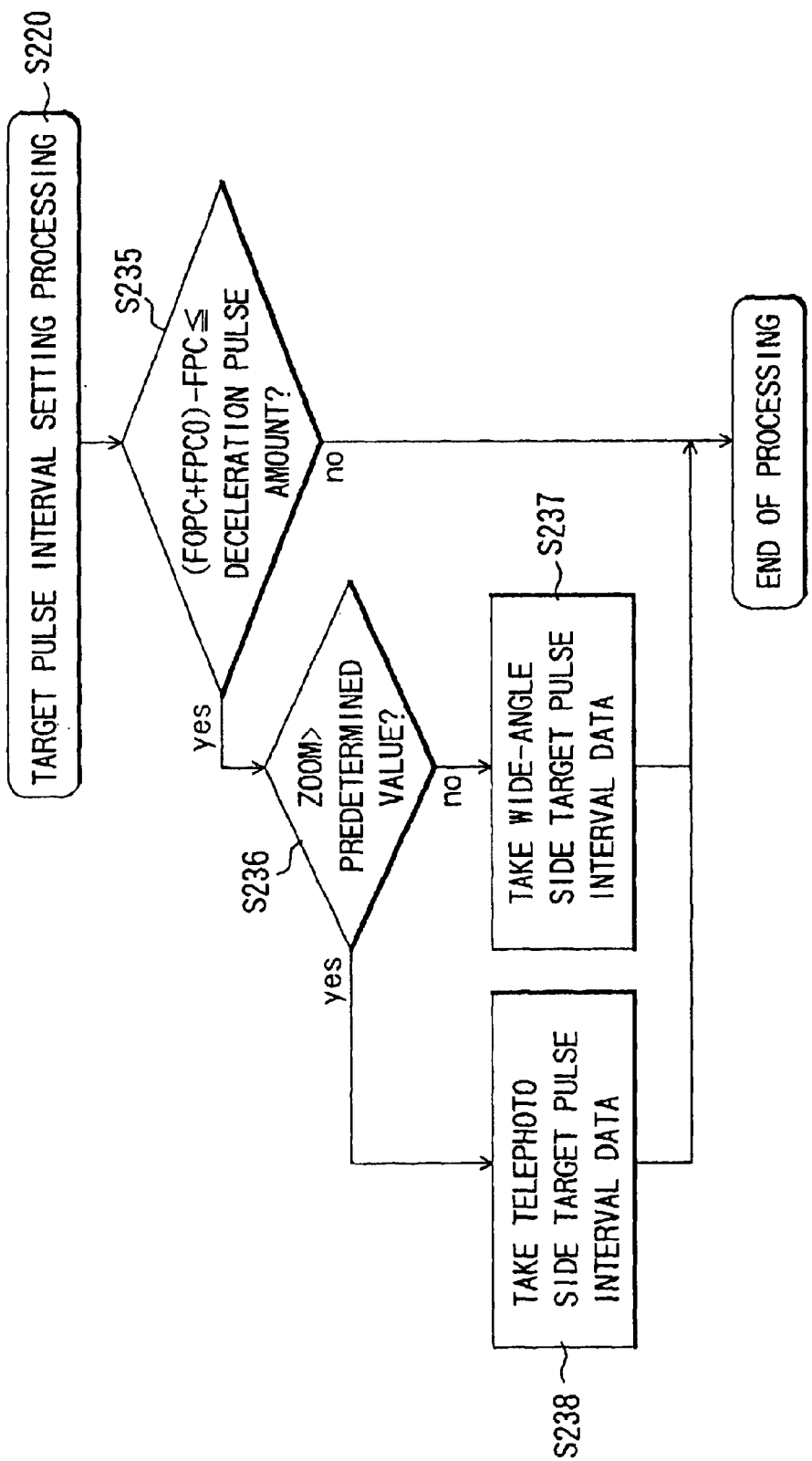
FIG. 15 is a flow chart for explaining the processing on the image-taking lens side in Embodiment 4.

Next, description is made for a subroutine in the processing of setting the target pulse interval performed at step 220 with reference to FIG. 15.

(Step 235)

The lens controller 219 determines whether or not the remaining driving amount (FOPC+FPCO)−FPC to the target position is equal to or smaller than the deceleration pulse amount. The remaining driving amount is equal to or smaller than the deceleration pulse amount, the flow proceeds to step 236. Otherwise, the target pulse interval setting processing is ended and the flow proceeds to step 221 of the main flow of FIG. 13B.

(Step 236)

The lens controller 219 reads a voltage value from the zoom brush 214 to determine whether or not the current position ZOOM of the zooming lens 212 is larger than a predetermined value. The predetermined value represents a previously set focal length of the image-taking optical system. The current position ZOOM of the zooming lens 212 larger than the predetermined value means that the zooming lens 212 is located on the telephoto side closer to the telephoto end than the focal length corresponding to the predetermined value, while the current position ZOOM smaller than the predetermined value means that the zooming lens 212 is located on the wide-angle side closer to the wide-angle end than the focal length corresponding to the predetermined value. When it is determined that the zooming lens 212 is located on the telephoto side, the flow proceeds to step 238. On the other hand, when it is determined that the zooming lens 212 is located on the wide-angle side, the flow proceeds to step 237.

(Step 237)

Since it is determined that the current focal length is on the wide-angle side at step 236, the lens controller 219 reads and sets pulse interval data for the target speed (T-SPD) from a wide-angle side deceleration data table (a deceleration control pattern).

(Step 238)

Since it is determined that the current focal length is on the telephoto side at step 236, the lens controller 219 reads and sets pulse interval data for the target speed (T-SPD) from a telephoto side deceleration data table (a deceleration control pattern).

The wide-angle side deceleration data table and the telephoto side deceleration data table are similar to those described in Embodiment 1 and shown in FIG. 6. In Embodiment 4, these deceleration data tables are previously stored in the ROM 219b.

Specifically, in Embodiment 4, the wide-angle side deceleration data table is set such that the deceleration rate to a predetermined remaining amount near the stop position (immediately before the stop) is smaller than on the telephoto side, and after the predetermined remaining amount, the speed is sharply reduced to stop the focusing lens 211.

The setting is made to reduce the driving time even when the target position is overrun. The setting is provided by making use of the fact that the focal depth is deeper on the wide-angle side while the focal depth is shallower on the telephoto side, so that high accuracy of stop position of the focusing lens 211 is required on the telephoto side but relatively lower accuracy is allowed on the wide-angle side as compared with the telephoto side as described earlier.

On the other hand, the telephoto side deceleration data table is set such that the deceleration rate to a predetermined remaining amount near the stop position (immediately before the stop) is large, and after the predetermined remaining amount, the speed is gently reduced to stop the focusing lens 211. This can provide high accuracy of stop position of the focusing lens 211 on the telephoto side.

The predetermined value serving as a threshold value for the determination whether or not the focal length is on the wide-angle side or telephoto side at step 236 is set on condition that a defocus amount on an image-pickup surface due to an overrun possibly caused when the focusing lens 211 is stopped in accordance with the wide-angle side deceleration data table does not exceed the permissible circle of confusion.

As described above, in Embodiment 4, speed control data for the deceleration control is changed depending on the focal length of the image-taking optical system. Thus, high accuracy of stop position of the focusing lens 211 can be maintained on the telephoto side, and the required accuracy of stop position can be relaxed to stop the driving more quickly on the wide-angle side, thereby allowing a reduction in driving time of the focusing lens 211.

While one focal length for changing the deceleration data table is set in Embodiment 4, a plurality of focal lengths for changing the deceleration data table may be set (for example, an additional deceleration data table is provided corresponding to an intermediate focal length between the telephoto side and the wide-angle side) to set speed control data for deceleration in more detail. It is thus possible to maintain the accuracy of stop position of the focusing lens 211 required for each focal length as well as to minimize the driving time.

While Embodiment 4 has been described for the case where the DC motor is used as the lens driving motor to achieve acceleration and deceleration through voltage control, a vibration type motor may be used in which periodic wave voltages with two different phases are applied to piezoelectric elements to excite vibration of a vibrator such that a contact body is relatively moved. In this case, acceleration or deceleration is performed by changing the frequency, voltage values, or a phase difference of the periodic wave voltages.

Although detailed description is not made, it is possible to combine the image-taking lens 202 described in Embodiment 4 with the control described in Embodiments 2 and 3.

The deceleration data tables or deceleration pulse amount data described in each of Embodiments 1 to 4 may be rewritable in consideration of differences in features among individual cameras or lens apparatuses (for example, the characteristics of the motors, sensitivity of focus adjustment to the position of the focusing lens, or the like).

While each of Embodiments 1 to 4 has been described for the digital camera or the digital camera system, the present invention is applicable to a film camera or a film camera system.

As described above, according to each of Embodiments 1 to 4, when the image-taking optical system is in a state in which high accuracy of stop position of the focusing lens is not required, such as when the focal length is on the wide-angle side or the set value of the diaphragm (stop) is on the narrowed side, the focusing lens can be stopped in a short time period. On the other hand, when the image-taking optical system is in a state in which high accuracy of stop position of the focusing lens is required, such as when the focal length is on the telephoto side or the set value of the diaphragm (stop) is on the opened side, the required high accuracy can be achieved. Therefore, focus adjustment can be performed in a short time period or with high accuracy depending on the state of the image-taking optical system.

While preferred embodiments have been described, it is to be understood that modification and variation of the present invention may be made without departing from the spirit or scope of the following claims.

What is claimed is:

1. A camera comprising:
   an image-taking optical system which includes a focusing lens and a zooming lens;
   a motor which drives the focusing lens;
   a controller which controls the motor such that the focusing lens is stopped at a target position by performing deceleration control in accordance with a predetermined deceleration control pattern; and
   a state detector which detects one of a focal length and a set value of the stop of the image-taking optical system,
   wherein the controller changes the deceleration control pattern in accordance with one of the focal length and the set value of the stop detected by the state detector; and
   the controller sets the deceleration control pattern in which, when the focal length of the image-taking optical system is on a wide-angle side closer to a wide-angle end than a predetermined focal length, the motor is decelerated for stopping at a deceleration rate larger than a deceleration rate when the focal length is on a telephoto side, after a remaining driving amount becomes less than a predetermined amount.

2. A camera comprising:

an image-taking optical system which includes a focusing lens and a zooming lens;

a motor which drives the focusing lens;

a position detector which detects a position of the focusing lens;

a controller which controls the motor such that the focusing lens is stopped at at a target position by performing deceleration control from the time when a difference between the target position and the position detected by the position detector is equal to or smaller than a predetermined amount; and a state detector which detects a focal length of the image-taking optical system, wherein the controller changes the predetermined amount in accordance with the focal length detected by the state detector.

3. The camera according to claim 2, wherein the controller sets the predetermined amount to a smaller amount when a focal length of the image-taking optical system is on a wide-angle side closer to a wide angle end than a predetermined focal length as compared with an amount set when the focal length is on a telephoto side.

4. A lens apparatus comprising:

an image-taking optical system which includes a focusing lens and a zoomimg lens;

a motor which drives the focusing lens;

a controller which controls the motor such that the focusing lens is stopped at a target position by performing deceleration control in accordance with a predetermined deceleration control pattern; and a state detector which detects one of a focal length of the image-taking optical system, wherein the controller changes the deceleration control pattern in accordance with the focal length detected by the state detector, and the controller sets the deceleration control pattern in which, when the focal length of the image-taking optical system is on a wide-angle side closer to a wide angle end than a predetermined focal length, the motor is decelerated for stopping at a deceleration rate larger than a deceleration rate when the focal length is on a telephoto side, after a remaining driving amount becomes equal to or less than a predermined amount.

5. A lens apparatus comprising:

an image-taking optical system which includes a focusing lens and a zooming lens;

a motor which drives the focusing lens;

a position detector which detects a position of the focusing lens;

a controller which controls the motor such that the focusing lens is stopped at a target position by performing deceleration control from time when a difference between the target position and the position detected by the position detector is equal to or smaller than a predetermined amount; and a state detector which detects a focal length of the image-taking optical system, wherein the controller changes the predetermined amount in accordance with the focal length by the state detector.

6. The lens apparatuw according to claim 5, wherein the controller sets the predetermined amount to a smaller amount when a focal length of the image-taking optical system is on a wide-angle closer to a wide-angle side closer to a wide-angle end than a predetermined focal length as compared with an amount set when the focal length is on a telephoto side.

7. A camera system comprising:

the lens apparatus according to claim 5; and a camera on which the lens apparatus is mountable.

8. A camera comprising:

an image-taking optical system which includes a focusing lens and a diaphragm;

a motor which drives the focusing lens;

a controller which controls the motor such that the focusing lens is stopped at a target position by performing deceleration control in accordance with a deceleration pattern selected from a plurality of deceleration patterns which includes different deceleration rate; and a state detector which detects a state of the diaphragm of the image taking optical system, wherein the controller select the deceleration pattern based on the state of the diaphragm detected by the state detector.

9. A camera comprising:

an image-taking optional system which includes a focusing lens and an aperture diaphragm;

a motor which drives the focusing lens;

a controller which controls the motor such that the focusing lens is stopped at a target position by performing deceleration control in accordance with a predermined deceleration control pattern; and a state detector which detects an aperture value of the image-taking optical system, wherein the controller changes the deceleration control pattern in accordance with aperture value detected by the state detector; and the controller sets the deceleration control pattern in which, when the aperture value of the image-taking optical system is on a narrowed said relative to a predetermined aperture value, the motor is decelerated for stopping at a decelerated rate larger than a deceleration rate when the aperture value is on an opened side, after a remaining driving amount becomes equal to or less than a predetermined amount.

10. A camera comprising:

an image-taking optical system which includes a focusing lens and an aperture diaphragm;

a motor which drives the focusing lens;

a position detector which detects a position of the focusing lens;

a controller which controls the motor such that the focusing lens is stopped at a target position by performing deceleration control from the time when a difference between the target position and the position detected by the position detector is equal to or smaller than a predermined amount; and a state detector which detects an aperture value of the image-taking optical system, wherein the controller changes the predermined amount in accordance with the aperture value detected by the state detector, when the aperture value of the image-taking optical system is on a narrowed side relative to a predetermined aperture value.

11. The camera according to claim 10, wherein the controller sets the predetermined amount to a smaller amount when the aperture value is on a narrow side relative to a predetermined aperture value as compared with an amount set when the aperture is on an opened side.

12. A lens apparatus comprising:
an image-taking optical system which include a focusing lens and an aperture diaphragm;
a motor which drives the focusing lens;
a controller which controls the motor such that the focusing lens is stopped at a target position by performing deceleration control in accordance with a predetermined deceleration control pattern; and
a state detector which detects an aperture value of the image-taking optical system,
wherein the controller changes the deceleration control pattern in accordance with the aperture value detected by the detector.

13. The lens apparatus according to claim 12, wherein the controller sets the deceleration control pattern in which, when the aperture value is on a narrowed side relative to a predermined aperture value, the motor is decelerated for stopping at a deceleration rate smaller than a deceleration rate when aperture value is on an opened side, until a remaining driving amount becomes equal to or less than a predetermined amount.

14. The lens apparatus according to claim 12, wherein the controller sets the deceleration control pattern in which, when the aperture value is on a narrowed side relative to a predetermined aperture value, the motor is decelerated for stopping at a deceleration rate larger than a deceleration rate when the aperture value is on an opened side, after a remaining driving amount becomes equal to or less than a predetermined amount.

15. A camera comprising:
an image-taking optical system which includes a focusing lens and an aperture diaphragm;
a motor which drives the focusing lens;
a controller which controls the motor such that the focusing lens is stopped at a target position by performing deceleration control in accordance with a predetermined deceleration control pattern; and
a state detector which detects an aperture value of the image-taking optical system,
wherein the controller changes the deceleration control pattern in accordance with the aperture value detected by the state detector.

16. A camera comprising:
an image-taking optical system which includes a focusing lens and an aperture diaphragm;
a motor which drives the focusing lens;
a controller which controls the motor such that the focusing lens is stopped at a target position by performing deceleration control in accordance with a predetermined deceleration control pattern; and
a state detector which detects a focal length of the image-taking optical system,
wherein the controller changes the deceleration control pattern in accordance with the focal length detected by the state detector, and
the controller sets the deceleration control pattern in which, when the focal length of the image-taking optical system is on a wide angle side closer to a wide-angle end than a predetermined focal length, the motor is decelerated for stopping at a deceleration rate larger than a deceleration rate when the focal length is on a telephoto side, after a remaining driving amount becomes equal to or less than a predetermined amount.

17. The camera according to claim 15, wherein the controller sets the deceleration control pattern in which, when the aperture value is on a narrowed side relative to a predetermined aperture value, the motor is deceleration for stopping at a deceleration rate when the aperture is on a opened side, until a remaining driving amount becomes equal to of a predetermined amount.

18. The camera according to claim 15, wherein the controller sets the deceleration control pattern in which, the aperture value is on a narrowed side relative to a predetermined aperture value, the motor is decelerated for stopping at a deceleration rate larger than a deceleration rate when the aperture value is on an opened side, after a remaining driving amount becomes equal to or less than a predetermined amount.

19. A lens apparatus comprising:
an image-taking optical systems which includes a focusing lens and an aperture diaphragm;
a motor which drives the focusing lens;
a position detector which detects a position of the focusing lens;
a controller which controls the motor such that the focusing lens is stopped at a target position by performing deceleration control from the time when a difference between the target position and the position detected by the position detector is equal to or smaller than a predetermined amount; and
a state detector which detects an aperture value of the image-taking optical system,
wherein the controller changes the predetermined amount in accordance with the aperture value detected by the state detector, when the aperture value of the image-taking optical system is on a narrowed side relative to a predetermined aperture value.

20. The lens apparatus according to claim 19, wherein the controller sets the predetermined amount to a smaller amount when the aperture value is on a narrowed side relative to a predetermined aperture value as compared with an amount set when the aperture value is on a opened side.

21. A camera system comprising:
the lens apparatus according to claim 12; and
a camera on which the lens apparatus is mountable.

22. A camera system comprising;
the lens apparatus according to claim 19; and
a camera on which the lens apparatus is mountable.

23. A lens apparatus comprising:
an image-taking optical system which includes a focusing lens a diaphragm;
a motor which drives the focusing lens;
a controller which controls the motor such that the focusing lens is stopped at a target position by performing deceleration control in accordance with a deceleration pattern selected from a plurality of deceleration patterns which includes different deceleration rate; and
a state detector which detects a state of the diaphragm of the image-taking optical system,
wherein the controller selects the deceleration pattern based on the state of the diaphragm detected by the state detector.

* * * * *

UNITED STATES PATENT AND TRADEMARK OFFICE
CERTIFICATE OF CORRECTION

PATENT NO.       : 7,003,222 B1
APPLICATION NO.  : 10/649965
DATED            : February 21, 2006
INVENTOR(S)      : Murakami It is certified that error appears in the above-identified patent and that said Letters Patent is hereby corrected as shown below:

In the Claims:

In Claim 1 (col. 20, line 60), please delete "one of".

In Claim 1 (col. 20, lines 60-61), please delete "and a set value of the stop".

In Claim 1 (col. 20, line 63), please delete "one of".

In Claim 1 (col. 20, lines 63-64), please delete "and the set value of the stop".

In Claim 1 (col. 21, line 6), please replace "becomes less than" with --becomes equal to or less than--.

In Claim 2 (col. 21, line 14), please replace "at at a target" with --at a target--.

In Claim 4 (col. 21, line 32), please replace "zoomimg" with --zooming--.

In Claim 4 (col. 21, line 38), please delete "one of".

In Claim 4 (col. 21, line 50), please replace "predermined" with --predetermined--.

In Claim 5 (col. 21, line 59), please replace "from time" with --from the time--.

In Claim 5 (col. 21, line 66), please replace "length by" with --length detected by--.

In Claim 6 (col. 22, line 1), please replace "apparatuw" with --apparatus--.

In Claim 6 (col. 22, line 4), please delete "closer to a wide angle".

In Claim 8 (col. 22, line 22) please replace "select" with --selects--.

In Claim 9 (col. 22, line 31), please replace "predermined" with --predetermined--.

In Claim 9 (col. 22, line 42), please replace "decelerated" with --deceleration--.

In Claim 10 (col. 22, line 57), please replace "predermined" with --predetermined--.

In Claim 10 (col. 22, line 60), please replace "predermined" with --predetermined--.

In Claim 11 (col. 23, line 1), please replace "narrow" with --narrowed--.

UNITED STATES PATENT AND TRADEMARK OFFICE
CERTIFICATE OF CORRECTION

PATENT NO. : 7,003,222 B1
APPLICATION NO. : 10/649965
DATED : February 21, 2006
INVENTOR(S) : Murakami It is certified that error appears in the above-identified patent and that said Letters Patent is hereby corrected as shown below:

In Claim 11 (col. 23, line 3), please replace "aperture is" with --aperture value is--.

In Claim 12 (col. 23, line 15), please replace "include" with --includes--.

In Claim 12 (col. 23, line 17), please replace "by the detector" with --by the state detector--.

In Claim 13 (col. 23, line 21), please replace "predermined" to --predetermined--.

In Claim 17 (col. 24, line 7), please replace "deceleration for" with --decelerated for--.

In Claim 17 (col. 24, line 8), please replace "rate when" with --rate smaller than a deceleration rate when--.

In Claim 17 (col. 24, line 8), please replace "aperture is on a" with --aperture value is on an--.

In Claim 17 (col. 24, line 10), please replace "to of" with --to or--.

In Claim 18 (col. 24, line 12), please replace "which, the" with --which, when the--.

In Claim 19 (col. 24, line 20), please replace "systems" with --system--.

In Claim 20 (col. 24, line 43), please replace "a opened side" with --an opened side--.

In Claim 23 (col. 24, line 52), please replace "lens a diaphragm" with --lens and a diaphragm--.

Signed and Sealed this

Fourteenth Day of October, 2008

JON W. DUDAS
*Director of the United States Patent and Trademark Office*